United States Patent [19]
Goodin

[11] Patent Number: 6,161,334
[45] Date of Patent: *Dec. 19, 2000

[54] CHILD AND PET SECURITY GATE

[75] Inventor: John Walter Goodin, Coto de Caza, Calif.

[73] Assignee: North States Industries, Inc., Minneapolis, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/798,871

[22] Filed: Feb. 11, 1997

[51] Int. Cl.[7] .................................................. E05D 15/26
[52] U.S. Cl. .................................. 49/125; 49/55; 160/211
[58] Field of Search .................................. 49/57, 55, 50, 49/463, 464, 125, 127; 160/211

[56] References Cited

U.S. PATENT DOCUMENTS

| | | | |
|---|---|---|---|
| 4,616,451 | 10/1986 | Glick | 49/125 X |
| 4,635,699 | 1/1987 | Kauffman et al. | 160/211 |
| 4,702,036 | 10/1987 | Johnson | 49/57 X |
| 4,777,765 | 10/1988 | Johnson | 49/55 |
| 4,831,777 | 5/1989 | Johnson | 49/55 |
| 5,632,514 | 5/1997 | Johnson | 49/55 X |

FOREIGN PATENT DOCUMENTS

| | | | |
|---|---|---|---|
| 269624 | 10/1912 | Germany | 49/125 |
| 2502765 | 7/1976 | Germany | 49/125 |
| 2058186 | 4/1981 | United Kingdom | 49/55 |

*Primary Examiner*—Jerry Redman
*Attorney, Agent, or Firm*—Merchant & Gould P.C.

[57] ABSTRACT

A child and pet security gate is disclosed for use in larger passageways. The security gate includes multiple (at least three) telescopically sliding panels that extend to close the passageway and retract to minimum width. The extension and retractive relative sliding movement is progressive; thus, only one panel moves relative to another until it reaches its fully extended or retracted position. The security gate also includes mounting hardware that permits the gate to either hingeably pivot or to be removed for storage. A latching member securely closes the gate and is operable only by an adult.

27 Claims, 20 Drawing Sheets

FIG. 4A
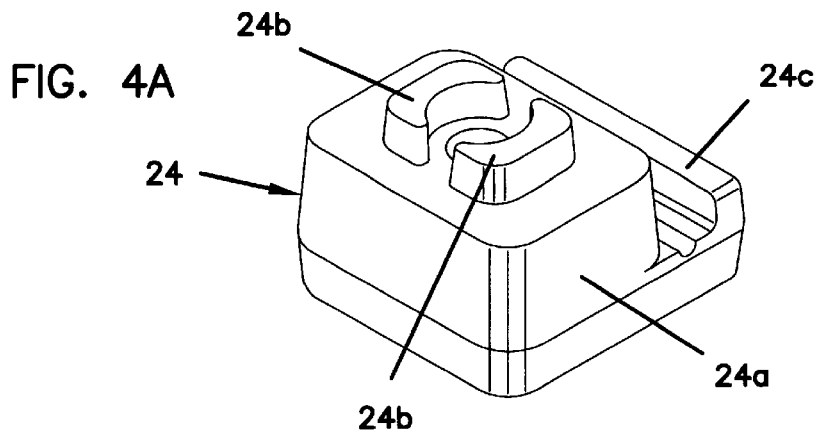
FIG. 4B
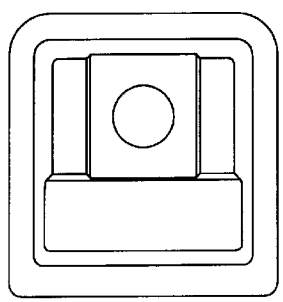
FIG. 4C  FIG. 4D  FIG. 4E
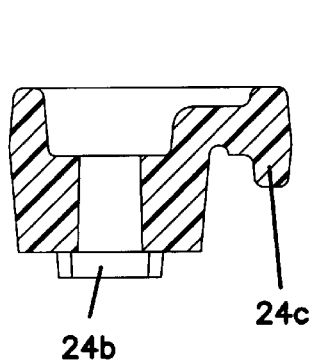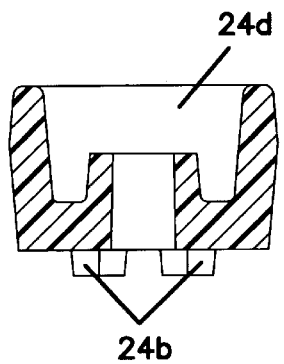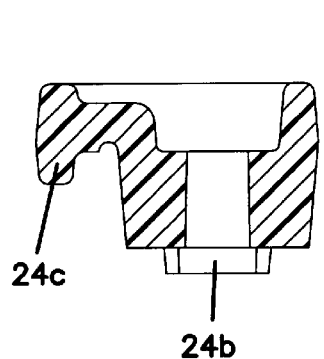
FIG. 4F
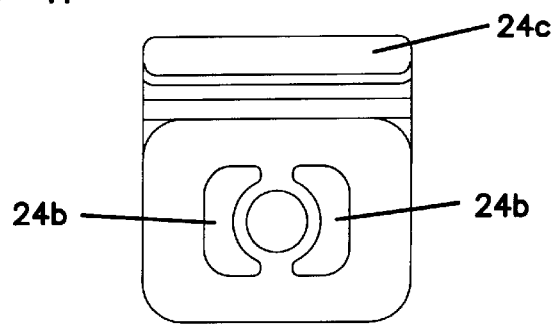

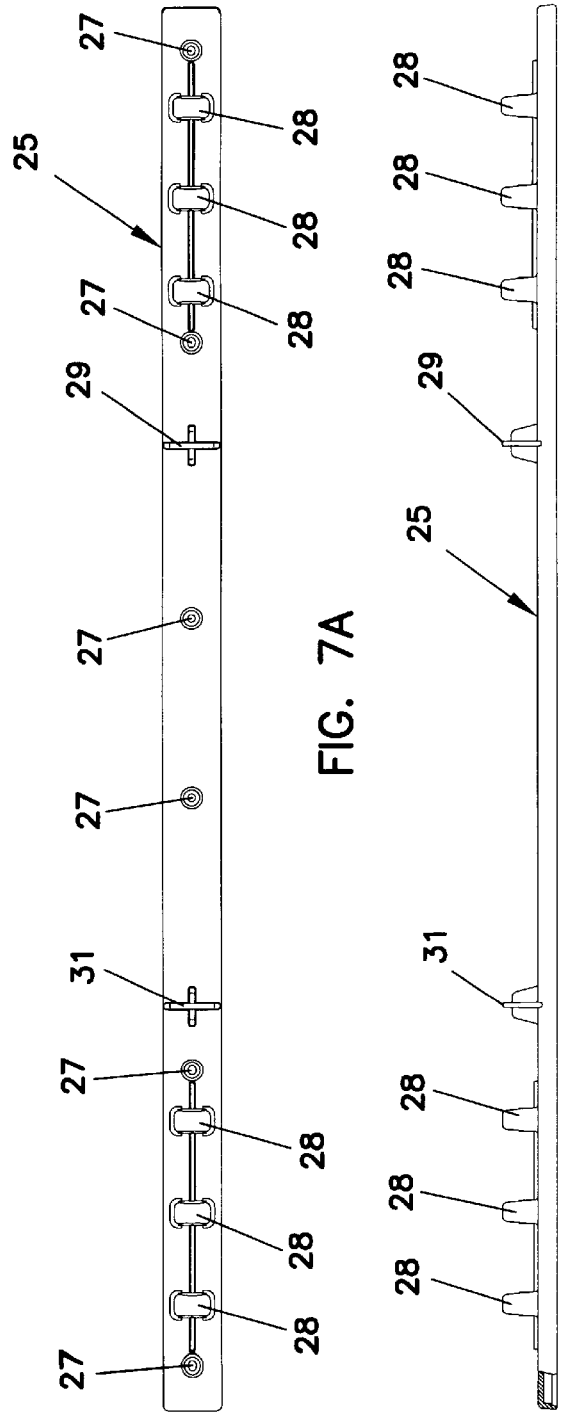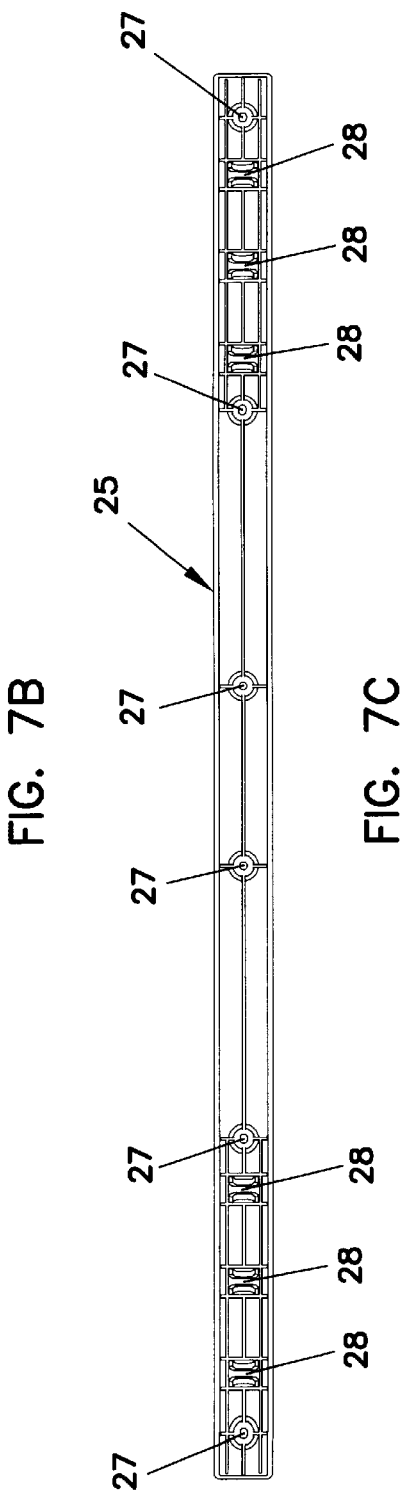

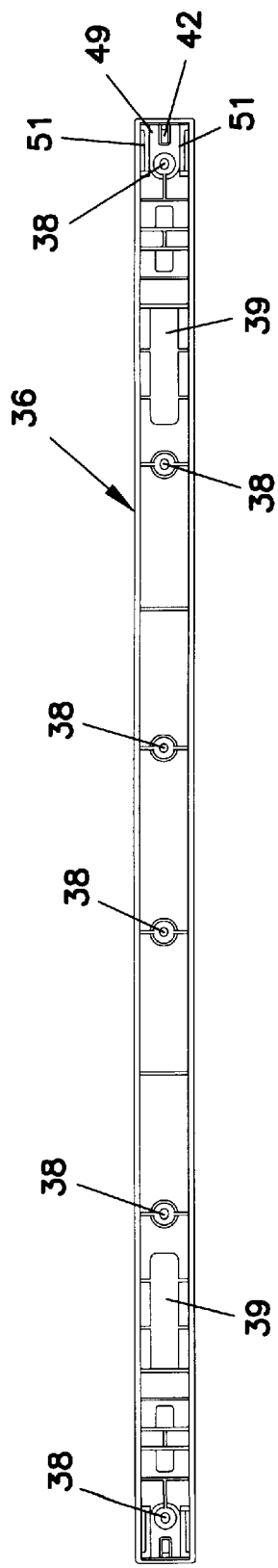
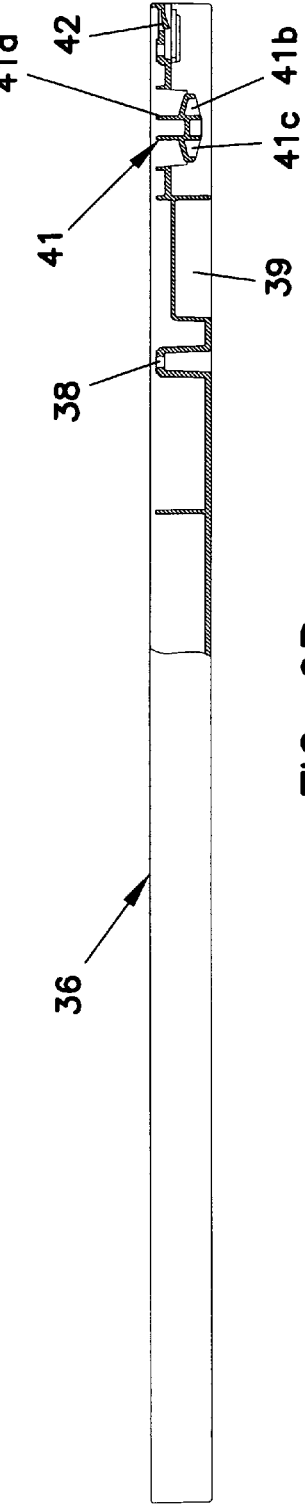
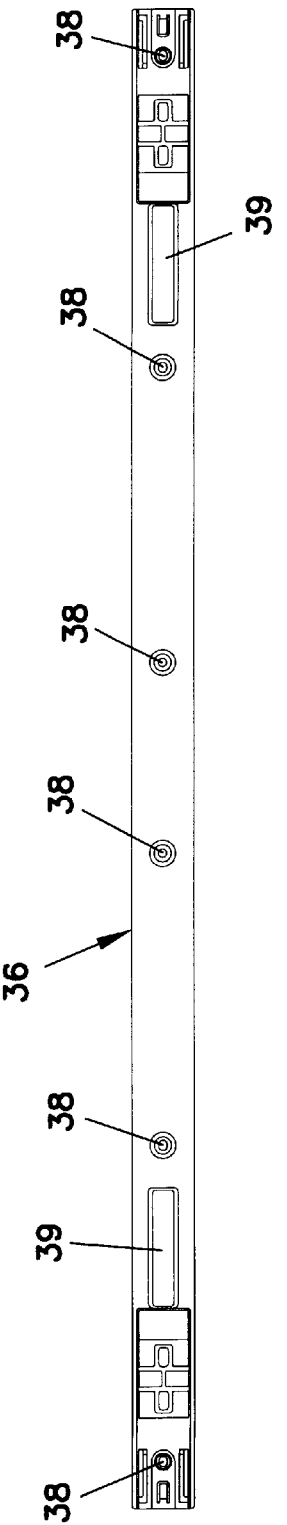
FIG. 9A
FIG. 9B
FIG. 9C

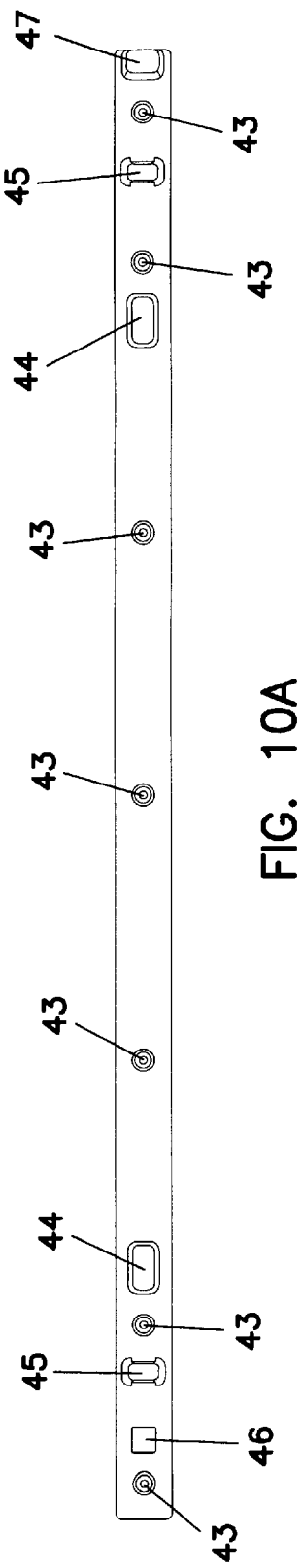
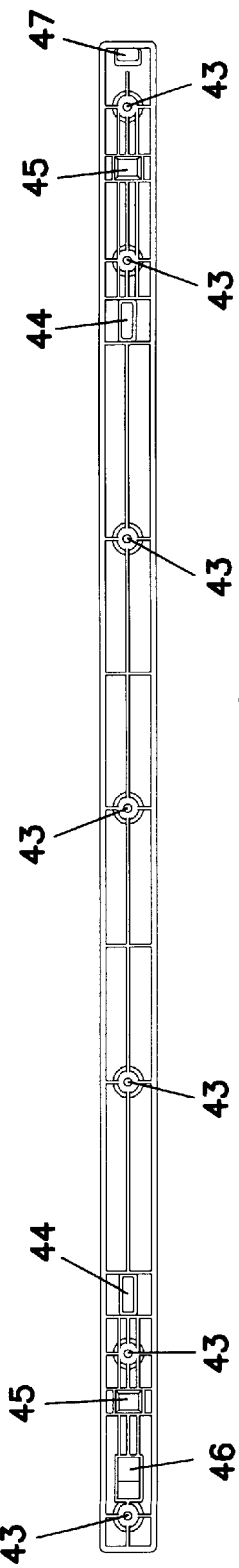
FIG. 10A
FIG. 10B
FIG. 10C

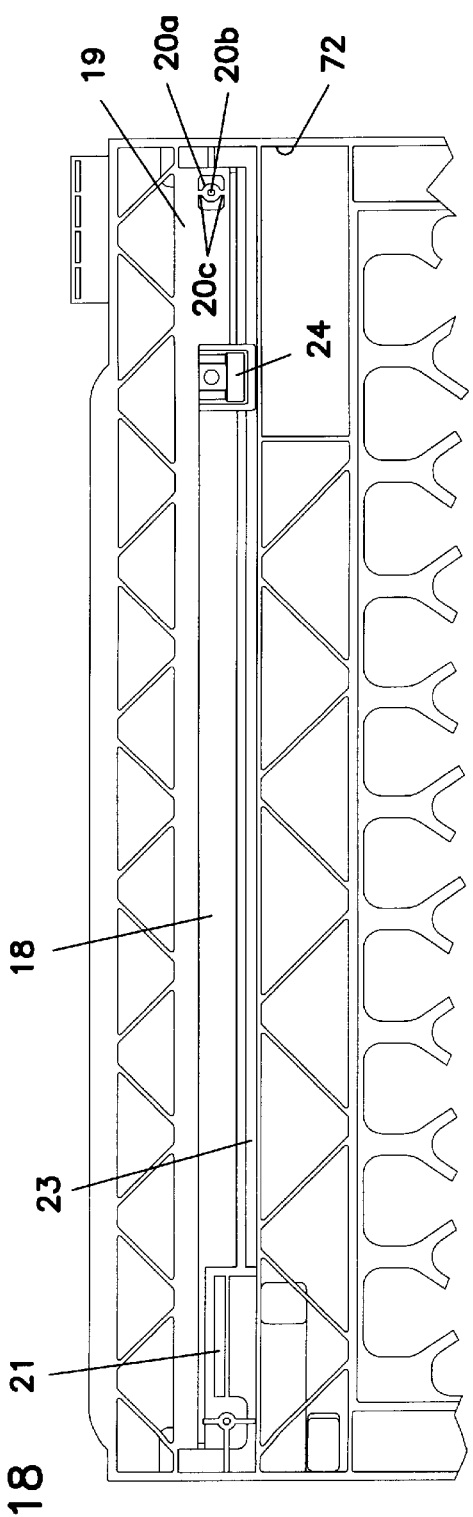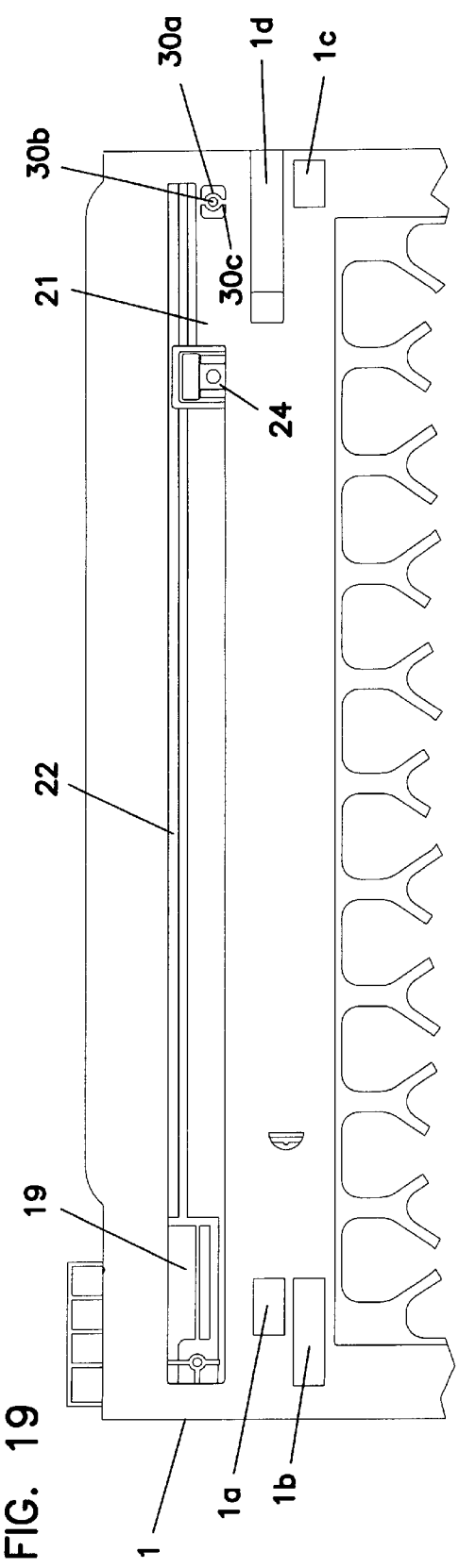

CHILD AND PET SECURITY GATE

The invention is directed to a child and pet security gate suitable for use in larger passageways.

Child and pet security gates are commonly used to lock or close passageways such as conventional doorways and entrances to stairwells. Their purpose is primarily security, such as keeping small children from having access to stairwells that could present a hazard, and also confinement, such as confining a pet to a particular room during the night.

Many types of child and pet security gates are available on the market today that range from the older accordion style gates formed from lattice-connected wood slats to more sophisticated lightweight plastic injected molded gates that permit rapid adjustment to width and closure.

A need in this technology that has not been fulfilled is a child and pet security gate capable of satisfactorily closing larger passageways; e.g., passageways of at least 42 inches and up to and even greater than five feet in width. Such passageways are commonly found in larger houses both new and old, (e.g., arched passageways between rooms) and also in newer houses of varying size in which openness is a desired feature. In such cases, the security gate is necessarily hardware mounted; i.e., one side is hinged into one side of the passageway with the other releasably latched to the opposite passageway side. One of the few types of security gates currently available for such a function are the older type accordion style gates formed from wood as described above. Such gates have a number of disadvantageous not the least of which is the fact that the larger the passageway width to span the less overall height the gate occupies. Further, wooden accordion style security gates are relatively heavy because they are typically made from hardwood for strength, and they are also very unwieldy in sizes large enough to close passageways greater than 42 inches.

There are no known plastic child and pet security gates currently available on the market that exceed 42 inches in width. It is theoretically possible to make a two panel plastic injection molded gate in which the panels slide relatively to adjust to the passageway size, but for such large passageways size of the gate would render it quite cumbersome. Further, telescoping panels of fairly significant width generally encounter slidability problems due to binding.

The objective of this invention is an affordable child security gate that will safely span larger passageways while having a construction that is not cumbersome or unwieldy to operate. The inventive gate utilizes multiple gate panels (i.e., three or more) which are relatively slidable in telescoping relation. This reduces the minimum width of the gate (i.e., the width when the gate panels are telescopically retracted), thus making it easy to use and store.

The use of multiple, relatively slidable panels make it possible for relative sliding movement to occur simultaneously between all of the gate panels as the gate is adjusted to width. This can be hazardous to the fingers of young children (or to the adults who operate the gate), particularly where the gate panels have open lattice work that permits the child or pet to see through it. In other words, fingers extended into and through the lattice work are subject to injury by the scissors or shearing action of relatively moving panels. This potentially dangerous problem has been uniquely solved by controlling relative movement between the gate panels in such a way that movement is limited to a single panel at any given point in time. More specifically, and assuming that four panels are used as in the preferred embodiment, the inventive gate included control means working in such a manner that, when extended, the first, second and third panels move together relative to the fourth panel until fully extended, at which time the first and second panels move together relative to the third panel until fully extended, after which the first panel moves relative to the second panel until fully extended (or until the passageway width is reached). Such controlled movement is referred to as progressive movement hereafter. When the gate is retracted, the gate panels again move progressively but in the reverse manner.

By controlling relative movement between the gate panels in this manner, the likelihood of injury to fingers is significantly reduced. Further, since the progressive movement is orderly and limited to one panel at a time, it minimizes slidability problems due to binding.

Slidability and finger protection is further facilitated in the preferred embodiment by providing on each individual panel an elongated rail at both top and bottom that slides relative to a structural groove or channel on the adjacent gate panel. In addition, stop members are provided in both top and bottom of each gate panel which limit the relative sliding movement at both fully retracted and fully extended positions. These stop means are constructed to be interlockably mounted on one panel while at the same time sliding in a guided relation relative to the adjacent panel. The rail and groove construction together with these stop members greatly enhance the slidability of one panel relative to its adjacent panel, affording easy extension and retraction movement even though the passageway width is relatively large.

In addition, the preferred embodiment includes unique hinging hardware that either permits the security gate to pivotally move between open and closed positions (i.e., it can be swung out of the way in a retracted position) or removed for storage. Further, a unique latching mechanism cooperates with hardware mounted on the opposite side of the passageway that firmly latches the gate when closed, and which is constructed and positioned to be operated only by an adult. In other words, the child security gate cannot be accidentally opened from the closed position by a child or a pet by leaning on the gate or by trying to manipulate it in some manner.

The inventive child and pet security gate will be more fully appreciated from the description and drawings.

BRIEF DESCRIPTION OF THE DRAWINGS

FIG. 4A is a perspective view of a stop member from the top and side thereof;

FIG. 4B is a rear elevational view of the stop member;

FIG. 4C is a transverse sectional view of the stop members viewed from one side thereof;

FIG. 4D is a transverse sectional view of the stop member as viewed from the back side thereof;

FIG. 4E is a transverse sectional view as viewed from the side opposite that of 4c;

FIG. 4F is a front elevational view of the stop member;

FIG. 7A is a front elevation of a first hinge rail constructed for mounting to the edge of a gate panel;

FIG. 7B is a side view of the hinge rail of FIG. 7a;

FIG. 7C is a rear elevation of the first hinge rail;

FIG. 9A is a rear elevation of a first locking rail mountable to the edge of a door panel;

FIG. 9B is a side elevation of the first locking rail, portions thereof being shown in section;

FIG. 9C is a front elevation of the first locking rail;

FIG. 10A is a rear elevation of a second locking rail mountable to a door jamb or other vertical mounting surface and constructed for interlocking engagement with the first locking rail of FIGS. 9a–c;

FIG. 10B is a side elevation of the second locking rail, portions thereof being shown in section;

FIG. 10C is a front elevation of the second locking rail;

FIG. 18 is an enlarged fragmentary rear elevation of the top portion of a gate panel; and FIG. 19 is an enlarged fragmentary front elevation of the top portion of a gate panel.

DETAILED DESCRIPTION OF THE PREFERRED EMBODIMENT

Figure 1:
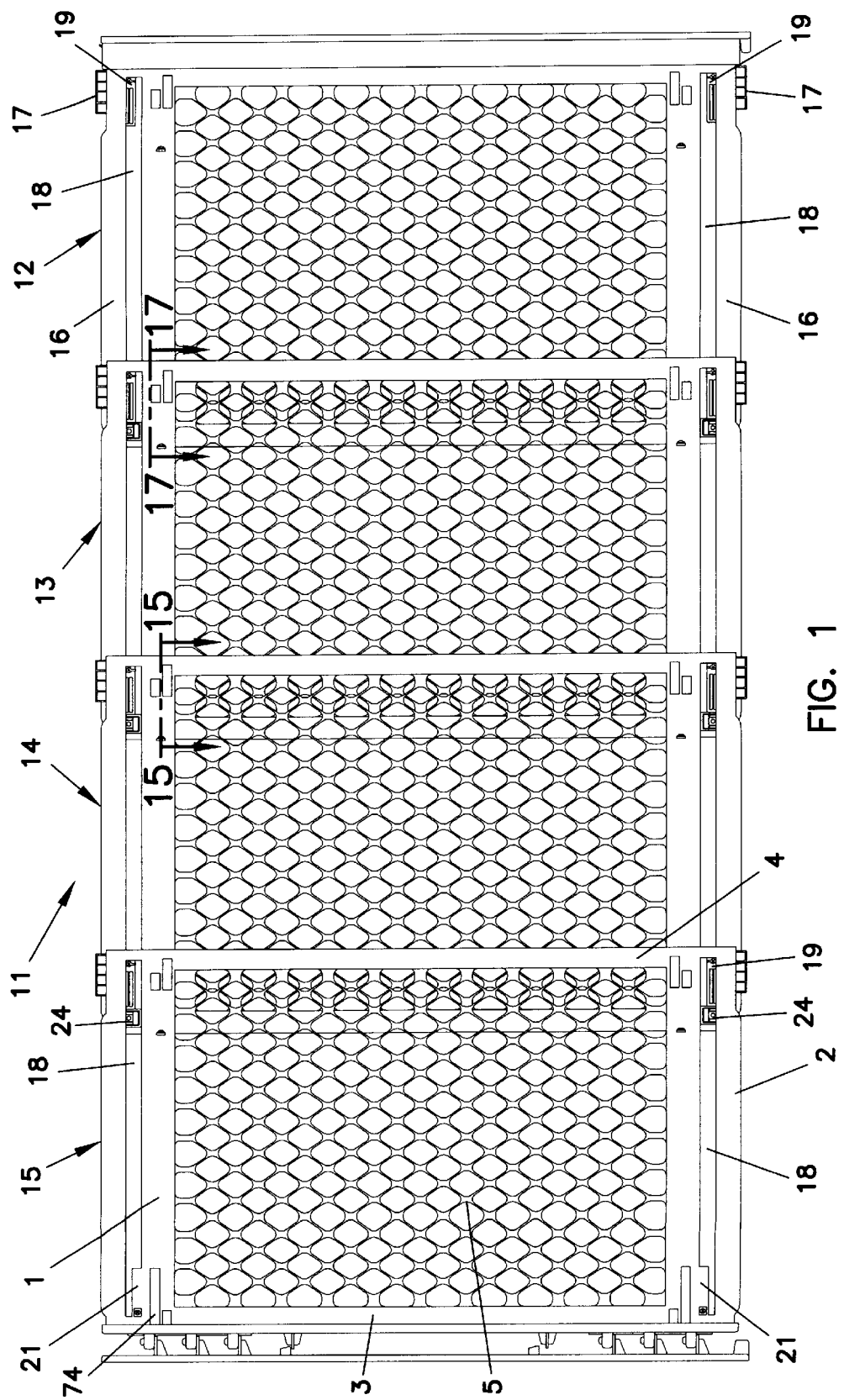
FIG. 1 is a front elevational view of a child and pet security gate embodying the invention.

With initial reference to FIG. 1, a child and pet security gate embodying the invention is represented generally by the numeral 11. In the preferred embodiment, security gate 11 includes four security gate panels 12–15 which are connected for relative guided sliding movement in progressive telescoping relation as discussed in further detail below. Gate panel 12 also will be referred to as the first or latching gate panel, gate panels 13, 14 also will be referred to as intermediate gate panels and gate panel 15 also will be referred to as the hinge or last gate panel.

With regard to the "timing" function of the invention as discussed in detail below, the security gate 11 preferably includes at least three gate panels. However, other features of the invention, such as the hinge and locking rails, may be used with security gates having as few as two gate panels.

Although the gate panels 12–15 may be fitted with different structural attachments to accomplish different functions as described more fully below, they are of identical construction in their fundamental form, which simplifies the security gate 11 from the standpoints of design, manufacture, assembly and overall cost.

Figure 2:
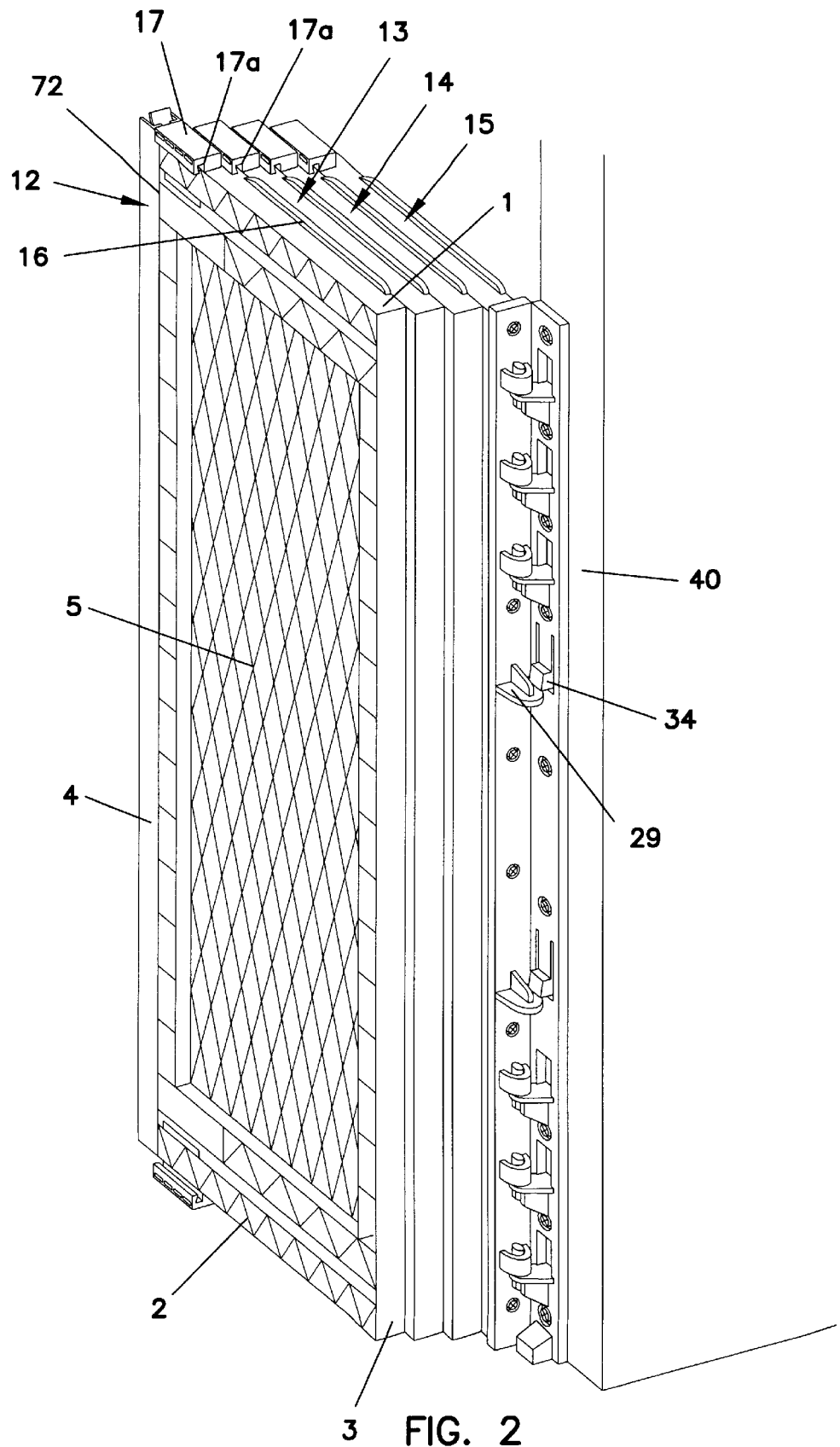
FIG. 2 is a perspective view from the rear and side of the child security gate showing its hinged connection to a door jamb.

With additional reference to FIG. 2, each of the gate panels 12–15 is of rectangular frame construction, including top and bottom frame members 1, 2 and side frame members 3, 4. Each panel includes an integral lattice structure 5 within the frame members that performs a security or blocking function while permitting the child or pet to see through it. In the preferred embodiment, each of the gate panels 12–15 is plastic injection molded.

Figure 3A:
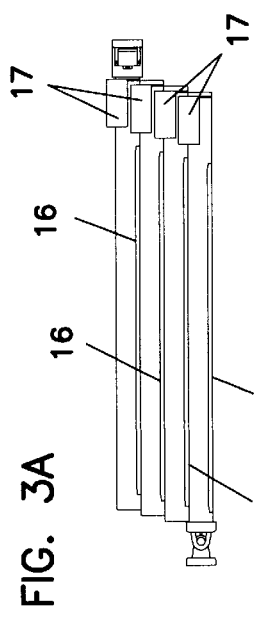
FIG. 3A is a top plan view of the child security gate in a retracted position.
Figure 3B:
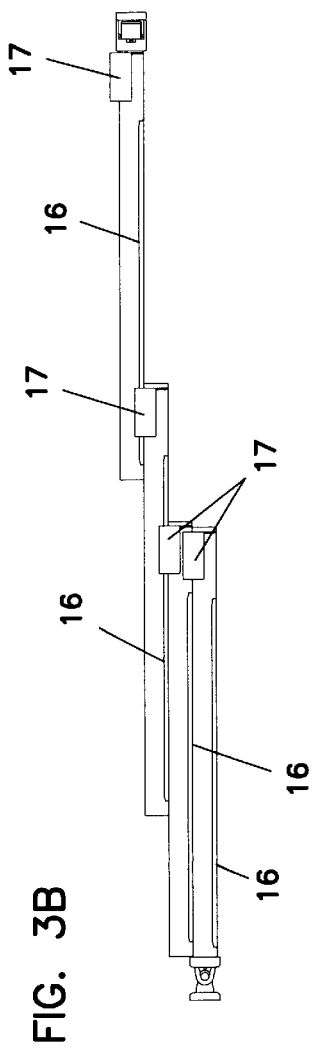
FIG. 3B is a top plan view of the child security gate in a partially extended position.
Figure 3C:
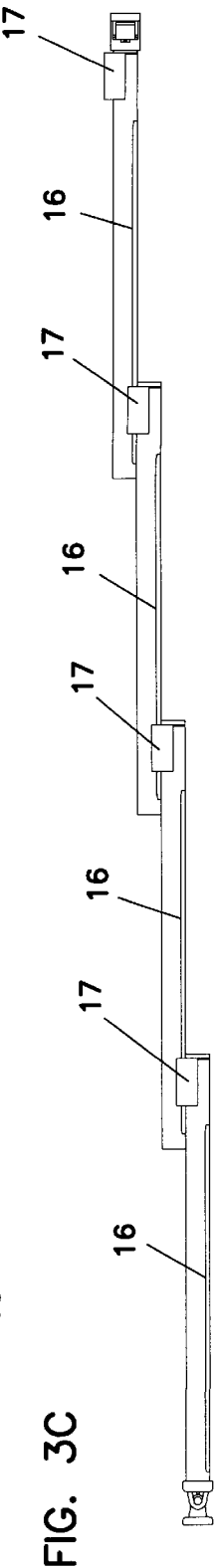
FIG. 3C is a top plan view of the child security gate in a fully extended position.

As indicated above, the gate panels 12–15 are connected for relative guided sliding movement in progressive telescoping relation. This guided sliding relationship is facilitated by a rail-groove structural relationship for which gate panel 12 is exemplary. As shown in FIGS. 1 and 2, a rail 16 is formed along the front edge of both the top and bottom frame members 1, 2 of gate panel 12, each rail 16 extending from a point proximate the outer face of frame member 4 to a point that approaches but does not reach the opposite frame member 3. Between this end of the rail 16 and the opposite panel edge is a box member 17 that protrudes laterally outward of the rear face of the panel 12, the underside of which defines a groove 17a sized and positioned to receive and guide the rail 16 of an adjacent gate panel. For example, the groove 17a of gate panel 13 receives and guides the rail 16 of gate panel 12 as shown in FIG. 2. This structural relationship is also shown in FIGS. 3a–c. As shown in FIG. 1, a rail 16 and box 17 are provided on both the top and bottom frame members 1, 2 of gate panel 12.

As constructed, and as shown in FIGS. 1, 2 and 3A–C, the gate panels 12–15 are relatively slidable in telescoping relation from a fully retracted position (FIGS. 2 and 3a) to a fully extended position (FIGS. 1 and 3c).

Figure 5:
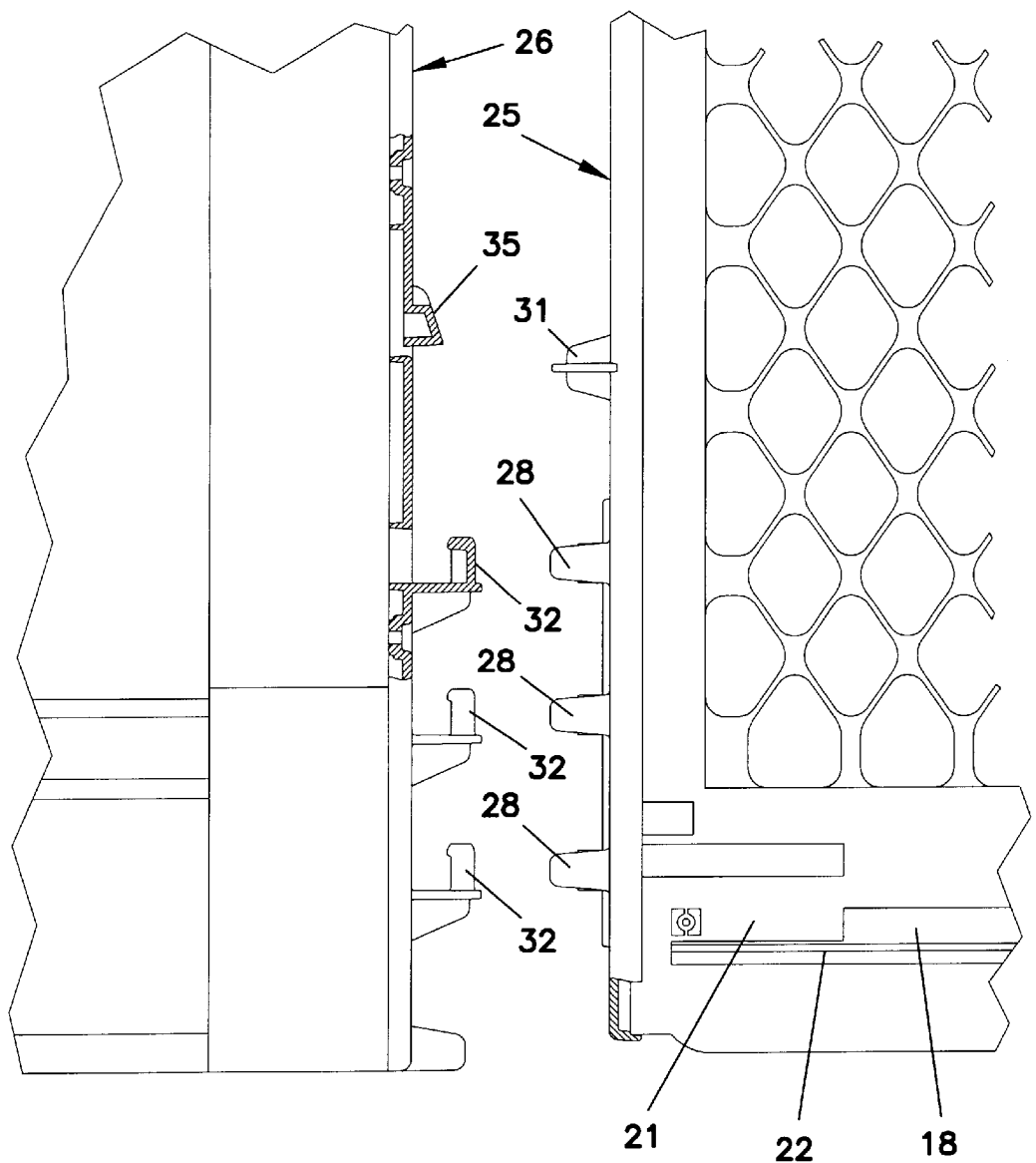
FIG. 5 is an enlarged front elevational view of a gate panel and its hinged relationship to a hinged member mounted to a door jamb.
Figure 6:
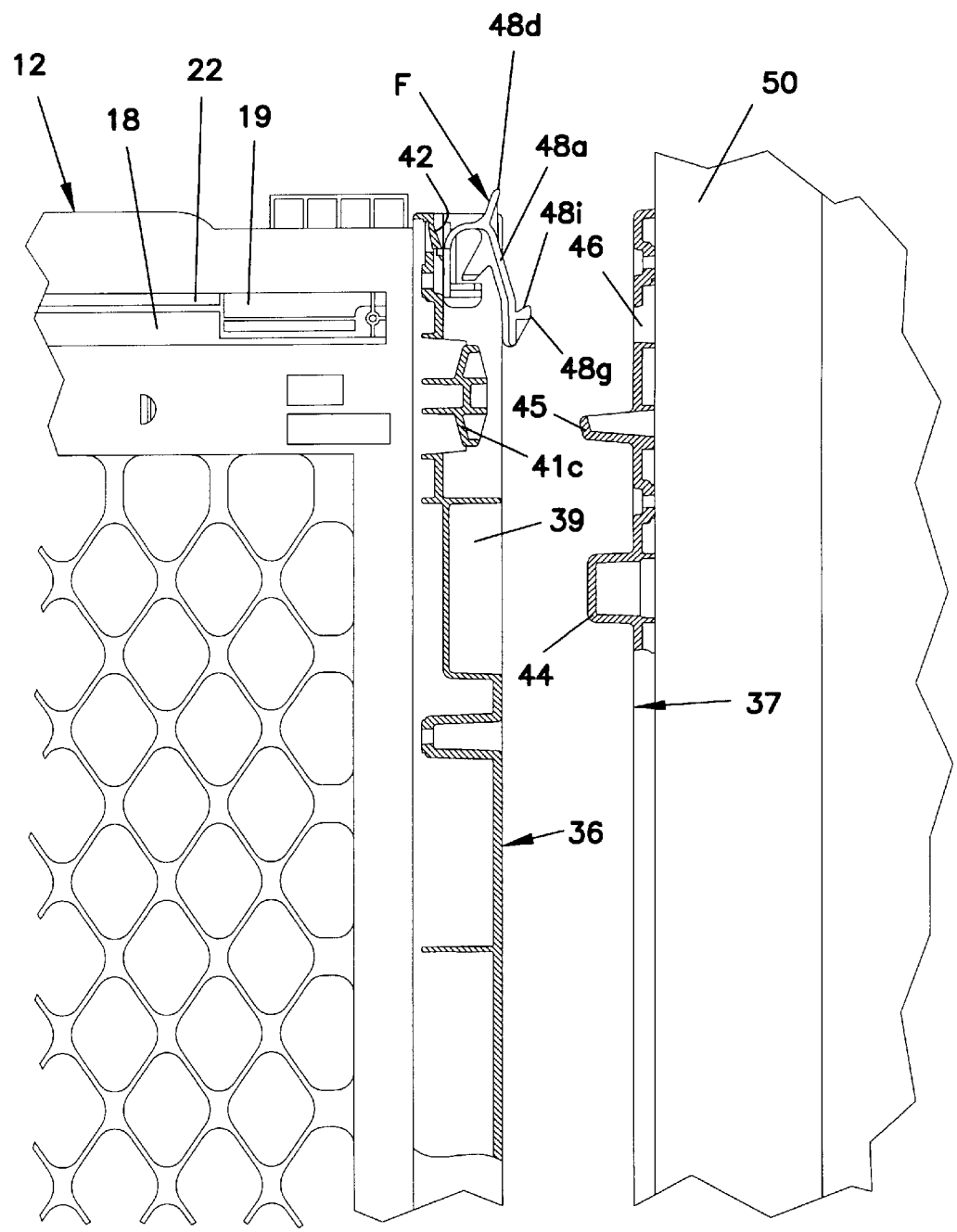
FIG. 6 is an enlarged fragmentary front elevational view of an extended gate panel showing its interlockable relationship with a locking rail mounted on a door jamb, portions thereof shown in section.

With reference to FIGS. 1, 5 and 6, the top frame member 1 of each of the gate panels 12–15 is formed with a longitudinal passage 18 that extends from one side frame member 3 to the opposite side frame member 4. The depth of the passage 18 corresponds to the thickness of the panel; i.e., it extends entirely through top frame member 1. On the right side of the each of the passages 18 as viewed in FIGS. 1 and 18, a rectangular downward projection 19 is formed coplanar with the rear face of the panel, projecting into the passageway 18 (see also FIG. 6). A rectangular projection 19 is similarly provided in the lower passage 18. At the left end of the passage 18, a similar rectangular projection 21 is formed coplanar with the front face of the panel and projecting into the passage 18 (see also FIGS. 5 and 19).

With reference to FIGS. 18 and 19, an upstanding circular boss 20a is formed in each projection 19 with a bore 20b in its center. Vertical ribs 20c extend above and below the boss. A similar boss 30a with a bore 30b and ribs 30c are formed in each projection 21.

With specific reference to FIG. 19, each top frame member 1 further includes an upper longitudinal groove 22 that occupies a portion of the passage 18, extending from the rectangular projection 19 (see FIG. 6) to the opposite side of the passage 18 (see FIG. 5). Longitudinal groove 22 faces the front face of the gate panel.

With reference to FIG. 18, a similar lower longitudinal groove 23 extends from rectangular projection 21, extending longitudinally to the opposite side of the passage 18. The longitudinal groove 23 faces the rear face of the gate panels.

With continued reference to FIGS. 18 and 19, it will be seen that longitudinal groove 22 extends along the upper edge of passage 18 and faces to the front of the associated panel, whereas the longitudinal groove 23 extends along the bottom edge of passage 18 and faces to the rear of the panel.

With momentary reference to FIGS. 4A–F, a stop member 24 of rectangular configuration includes an upstanding rectangular projection 24a the top of which is formed with a pair of arcuate bosses 24b. A short rail member 24c extends along one edge of the stop member 24 in spaced relation to the projection 24a. The rail member 24c is sized and positioned to fit into either of the longitudinal grooves 22, 23.

The rear face of stop member 24 includes a recess 24d leading to a bore 24e that receives a screw in countersunk relation.

With continued reference to FIG. 18, a stop member 24 is placed into the passage 18 of the gate panel with its rail member 24c slidably disposed in the longitudinal groove 23. Although the stop member 24 is placed in the passage 18 of this panel, it is screwed into the bore 30a of the rectangular projection 21 of the adjacent panel, with its arcuate bosses 24b interlockably fitting over the associated circular upstanding boss 30a and ribs 30c. A stop member 24 is similarly positioned in the bottom passage 18.

With reference to FIG. 19, a stop member 24 is positioned in the passage 18 of the adjacent panel with its rail member 24c slidably engaging the groove 22 of this adjacent gate panel. However, this stop member 24 is screwed to the first gate panel with its arcuate bosses 24b interlockably engaging the upstanding circular boss 20a and ribs 20c of the rectangular projection 19. A similar stop member is placed in the lower passage 18.

As constructed and assembled, four stop members 24, two in each of the passages 18, provide guided slidable movement as these adjacent panels slide relative to one another. In the extended position (i.e., with the adjacent panels in their widest position), an upper and lower stop member 24 each abuttably engages the rectangular projection 21 to prevent the adjacent panels from slidably disengaging. At the same time, the other pair (upper and lower) stop members 24 each abuttably engages the associated rectangular projection 19. This construction provides positive guided slidable movement between the two adjacent panels as well as a positive stop when the most extended position is reached. This enables the slidable interconnection of several gate panels to span doorways or other passageways of extreme width (see FIGS. 1 and 3C).

With security gates of this width, it is preferable to hingeably mount one side of the security gate 11 to one door jamb and to provide a latching mechanism to latch the extended side of the security gate 11 to the opposite door jamb.

The hinge mechanism is shown in FIGS. 2, 5, 7A–C and 8A–C. Specifically, it includes a first hinge member 25 mounted to the outside edge of hinge gate panel 15 and a second longitudinal hinge member 26 that it mountable to a door jamb 40. With specific reference to FIGS. 7A–C, first hinge member 25 is longitudinal in configuration having a width that is slightly greater than that of the gate panel 15 to which it is connected. Such connection is by a plurality of screws that pass through countersunk bores 27 spaced over the length of the member 25. Three upper loops and three lower loops 28 project forwardly from the face of the first hinge member 25. The hinge loops 28 are symmetrically disposed relative to the center of the member 25.

Also projecting forward from the face of the hinge member 25 are reinforced bearing members 29, 31, the spacing of which is not symmetrical, and the purpose of which is described below.

Figure 8A:
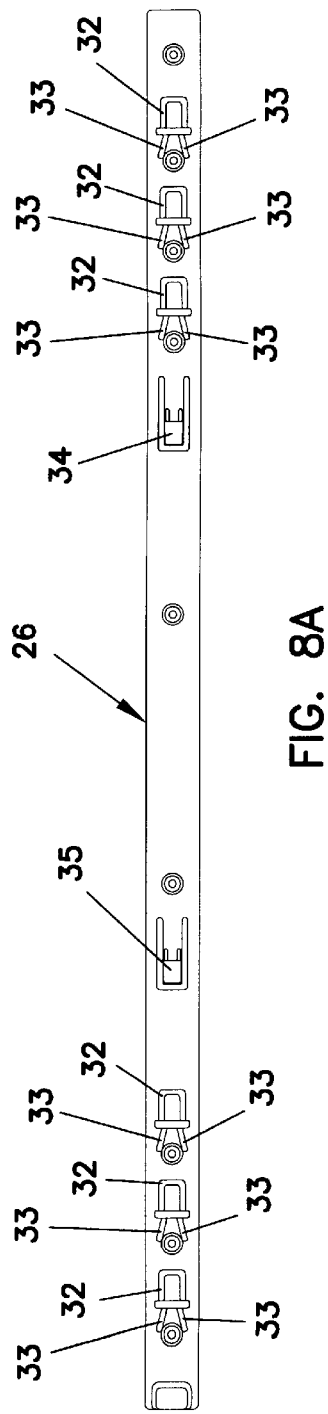
FIG. 8A is a front elevation of a second hinge rail mountable to a door jamb or other vertical surface which cooperates with the first hinge rail of FIGS. 7a–c.
Figure 8B:
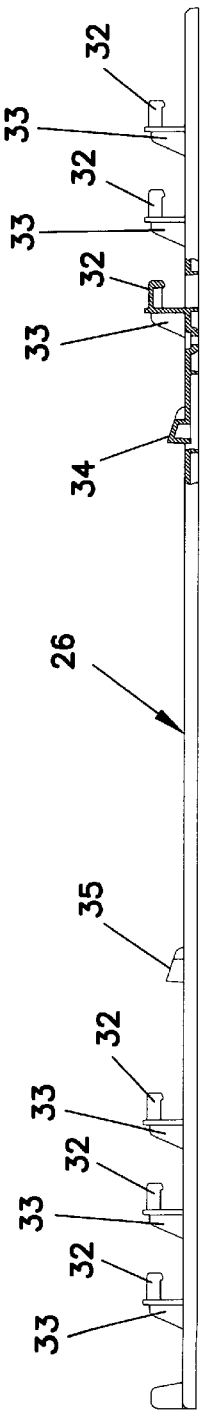
FIG. 8B is a side elevation of the second hinge rail, portions thereof being shown in section.
Figure 8C:
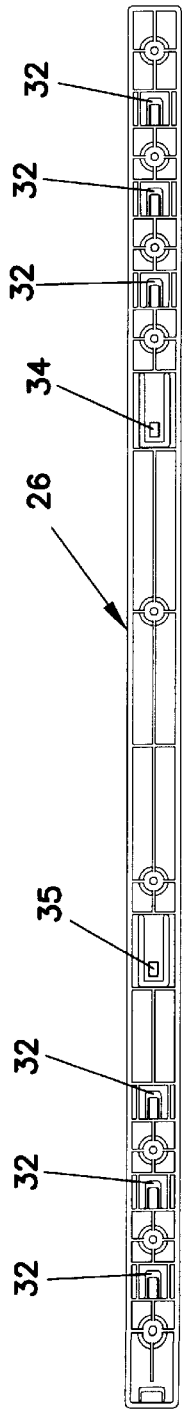
FIG. 8C is a rear elevation of the second hinge rail.

With reference to FIGS. 8A–C, the second hinge member 26 is formed with three upper and three lower hinge pins 31 each of which is carried by a reinforced pedestal 33. The hinge pins 32 are disposed symmetrically and in a position for simultaneous insertion into the hinge loops 28.

Second hinge member 26 also comprises a cantilevered, resiliently deflectable pawl member 34 that is positioned to be engaged by one of the bearing members 29, 31. Pawl member 34 has an angled face that facilitates its deflection as described below.

Second hinge member 26 further includes a second or lower resiliently deflectable pawl member 35 that is positioned to be deflected by and subsequently bear on the other of the bearing members 29, 31.

The first hinge member 25 interlockably fits onto the second hinge member 26 with the hinge loops 28 sliding over the respective hinge pins 32. With the loops 28 positioned slightly above the hinge pins 32, the hinge member 25 is allowed to move downward over the pins 32, at which time both of the pawl members 34, 35 are engaged and laterally deflected by the associated bearing members 29, 31. However, after this deflection has occurred and the first hinge member 25 is seated onto the second hinge member 26, only the upper pawl member rests on and is supported by the associated bearing member (as shown in FIG. 2, the pawl member 34 rests on the bearing member 29). Because the gate panels 12–15 and the first hinge member 25 are symmetrically constructed, the security gate 11 may be placed either right side up or upside down on the second hinge member 26. In the alternate position, pawl 35 rests on and is supported by the bearing member 29. In either case, the pawl member 34 or 35 travels around the peripheral edge of the associated bearing member 29, 31, permitting the security gate 11 to be hingeably swung through 180°.

The latching mechanism for the security gate is shown in FIGS. 6, 9A–C, 10A–C, 11A–D and 12. Specifically, the latching mechanism includes a first longitudinal latching rail 36 shown in FIGS. 9A–C the length of which corresponds to the height of the associated gate panel and the width of which is slightly greater than the thickness of the associated gate panel. With reference to these Figures, first latching rail 36 includes a plurality of bores 38 spaced over its length to receive screws for fastening the strip to the outside edge of gate panel 12. The first latching rail 36 must have depth to accommodate the latching member as discussed below, and to that end the four intermediate bores 38 are significantly recessed as best shown in FIG. 9B.

Proximate each end of latching rail 36 is a rectangular socket 39 the purpose of which is described below.

Disposed between each of the rectangular sockets 39 and the extreme end of the first latching rail 36 is an irregularly shaped projection 41 consisting of an outwardly projecting pedestal 41*a*, an upwardly projecting pin member 41*b* and a downwardly projecting pin member 41*c*. An identical projecting member 41 is symmetrically disposed at the opposite end.

At the extreme end of the first latching rail 36 is a resiliently flexible pawl member 42 the purpose of which will be described below.

With reference to FIGS. 10A–C, a second longitudinal latching rail 37 includes a plurality of countersunk bores 43 spaced over its length enabling it to be screwed to a door jamb 50 or other vertical surface disposed in opposition to door jamb 27 (see FIG. 6). Second latching rail 37 includes a pair of symmetrically disposed rectangular bosses or projections 44 that are positioned for insertion into the rectangular sockets 39 of first latching rail 36. Above and below the sockets 44 are a pair of symmetrically disposed, outwardly projecting loops 45 each of which is sized and positioned to fit over the respective projecting pin members 41*b,c*. Above the upper loop 45 is a rectangular aperture 46. Below the lower loop 45 is an outwardly projecting foot 47. During installation, the foot 47 rests on the top of the floor surface over which the security gate 11 is mounted. If the floor is a hard surface, such as wood or tile, the foot rests directly on the floor surface. If the floor surface is carpeted, the foot rests on the top of the carpet for optimum operation.

Because the first latching rail 36 is symmetrically constructed, it may interlockably engage the second latching rail 33 (which is asymmetric) either in a right side up or upside down position. Accordingly, with the first latching rail 36 mounted to the outside edge of gate panel 12, the entire security gate 11 may be mounted in either a right side up or upside down position, enabling the user to choose the side on the doorway from which the security gate will be hingeably mounted as well as whether the gate will swing inward or outward. However, because the components of the second latching rail 37 are not symmetrically disposed, this rail can be oriented only as shown in FIGS. 10A–C. As such, when the security gate 11 is properly oriented with respect to hinge location and swinging direction, a latching member 48 is interlockably inserted into the first latching rail 36, which renders the gate 11 usable only in the selected position and enables it to be selectively latched to the second locking rail 37 when it is properly mounted to the door jamb 50.

With reference FIGS. 11A–D, latching member 48 is an irregularly shaped member of generally U-shaped configuration, including a longer leg 48*a*, a shorter leg 48*b* and an interconnecting segment 48*c*. A thumb tab 48*d* projects from the interconnecting segment 48*c* in a direction that forms an obtuse angle with longer leg 48*a*. A reinforcement 48*e* lies between the leg 48*a* and thumb tab 48*d*.

Figure 11A:
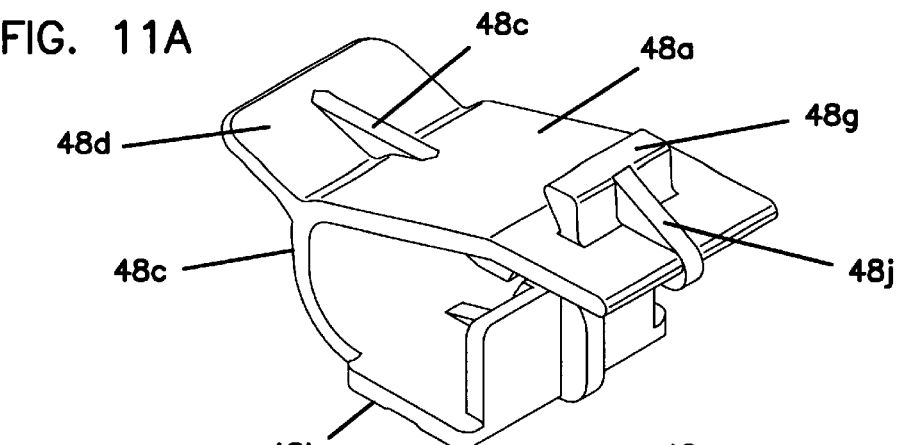
FIG. 11A is a perspective view of a latching member mountable in the first locking rail of FIGS. 9a–c.
Figure 11B:
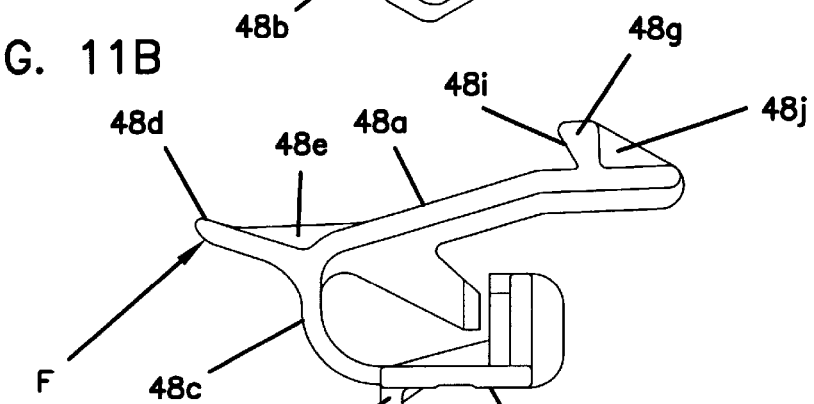
FIG. 11B is a side elevation of the latching member.
Figure 11C:
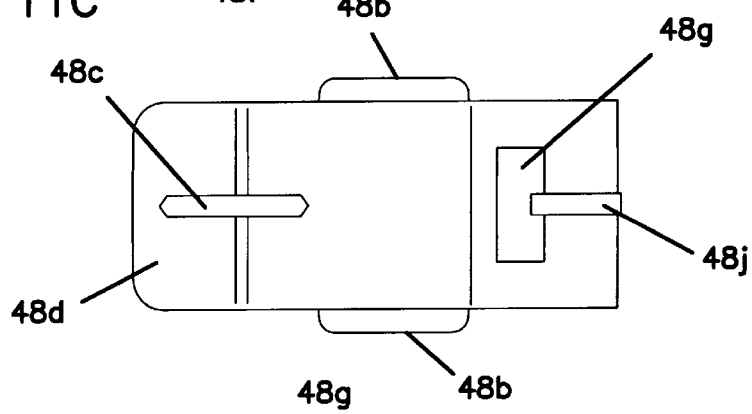
FIG. 11C is a rear elevation of the latching member.
Figure 11D:
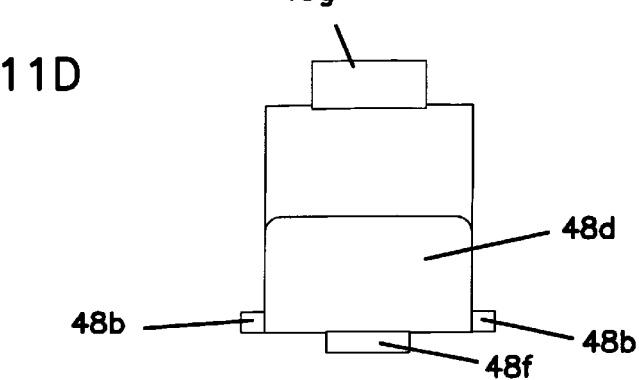
FIG. 11D is a top plan view of the latching member.
Figure 12:
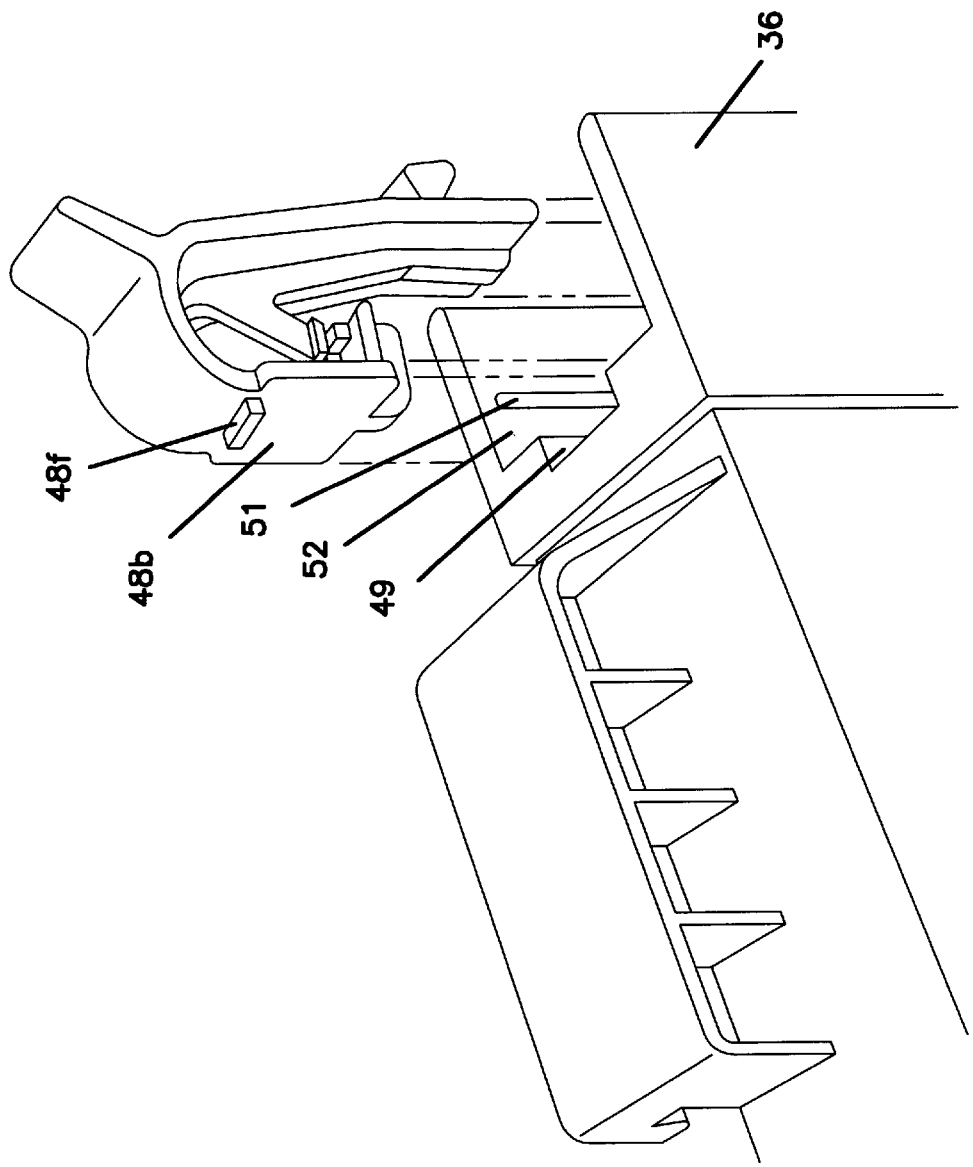
FIG. 12 is a fragmentary exploded perspective view of the latching member and first locking member.

In the preferred embodiment, latching member 48 is injected molded from plastic, and it is constructed so that the longer leg 48*a* may be resiliently deflected toward shorter leg 48*b* by the application of a force F imposed by a user's thumb (see FIG. 11B). The outer face of shorter leg 48*b* is formed with a small rectangular boss 48*f* (see FIGS. 11B and 11D). With additional reference to FIGS. 9A and 12, the upper end of the first latching rail 36 is formed with the vertically disposed rectangular recess or channel 49 in which the pawl 42 is disposed. On each inner face of the upper end of first latching rail 36 is a pair of vertically disposed ribs 51 that define a vertical groove 52 (FIG. 12). The shorter leg 48*d* is sized for guidable insertion into the groove 52*b*, as best shown in FIG. 12, with the rectangular boss 48*f* slidably guided in the rectangular channel 49. With additional reference to FIG. 6, such slidable movement continues with the rectangular boss 48*f* resiliently deflecting the pawl 42. At the point at which the shorter leg 48*b* reaches the bottom of channel 52 (at which point further movement is precluded), the boss 48*f* simultaneously clears the pawl 42, which resiliently returns to its normal position and thereafter abuttably engages the top surface of boss 48*f*. In this position, latching member 48 is locked into place.

With continued reference to FIGS. 6, 11A, 11B and 12, a latching boss 48*g* is formed on the outer face of longer leg 48*a*. Latching boss 48*g* is generally of rectangular configuration, although it includes an angled or inclined surface 48*i* (FIG. 11B). A reinforcement 48*j* is disposed between the boss 48*g* and leg 48*a*.

With specific reference to FIG. 6, latching boss 48*g* is sized to fit into the rectangular aperture 46 of the second latching rail 37 with the inclined surface 48*i* engaging the upper edge defining aperture 46. Further, there is a defined spaced relationship between the seated latching member 48, and the latching boss 48*g* in particular, with the downwardly projecting pin member 41*c* of first locking rail 36. A similar relationship exists between aperture 46 and the adjacent loop 45 on second latching rail 37. Based on this structural relationship, the first latching rail 36 may be engageably inserted into the second latching rail 37. In so doing, rectangular projection 44 is inserted into the lower portion of rectangular socket 39, loop 45 is inserted into the recess immediately below projecting pin 41*c*, and latching boss 48*g* abuttably engages the face of second latching rail 37 immediately above aperture 46. In order for the two latching rails 36, 37 to be brought together, longer leg 48*a* of latching member 48 must be inwardly deflected.

At the lower end of the latching rails 36, 37, the lower projection 44 enters the lower rectangular socket 39, and the lower loop 45 is inserted into the recess immediately below the lower projecting pin 41*c*.

Latching rail 36 (as attached to gate panel 12) is then lowered relative to the stationary latching rail 37. This causes the two rectangular projections 44 to be guided within the rectangular sockets 39, and the two projecting loops 45 engage and are retained by the associated projecting pins 41*c*. At the same time, boss 48*g* enters aperture 46, and the resilience of latching member 48 causes leg 48*a* to flex laterally outward with the inclined surface 48*i* abuttably and retainably engaging the upper edge of aperture 46. In this position, first latching rail 36 is firmly and interlockably engaged with second latching rail 37. This locking engagement may be released by imposing a thumb force F onto the thumb tab 48*d* as shown in FIG. 6. This causes the longer leg 48a to flex inward, retracting latching boss 48g from aperture 46. At this point, first locking rail 36 (and the gate panel 12) may be raised, freeing the projecting pins 41c from the associated loops 45. Latching rail 36 may then be moved away from latching rail 37.

Security gate 11 includes structural components that operate to cause the respective gate panels 12–15 to extend one at a time and to retract one at a time; i.e., in a progressive relation. These functions are controlled by a first panel control member 53 (FIGS. 14A–14D) and a second panel control member 54 (FIGS. 16A–16D). Both of the control members 53, 54 are disposed in a housing 55 shown in FIGS. 13A–13D.

With reference to FIGS. 14A–14D, first panel control member 53 is an irregularly shaped elongated member having a first end 56, a second end 57 and a pivot axis 58 therebetween. First end 56 terminates in a point 56a that defines an abutment surface. Second end 57 terminates in a transverse, hook-shaped member defining an abutment surface 57b on its underside.

Pivot axis 58 is defined by a circular bearing member 59 that projects upwardly from an annular collar 61. A spring member 62 taking the form of a steel strip is frictionally retained within a slot 63 formed adjacent the collar 61. When engaged at its free end, spring 62 bears against collar 61 and is resiliently flexed.

With reference to FIGS. 16A–16D, second panel control member 54 is also irregularly shaped, defining a primary body member 64 the outer end of which terminates in a large hook-shaped member 65. Member 65 has a forward rejection defining an angled abutment surface 65a. A rearward projection defines a bearing surface 65b.

A pivot axis 66 disposed at the inner end of leg ember 64 is defined by a circular bearing member 67 that projects from an annular collar 68. A spring 69 is frictionally disposed in a slot 71 in a position to be resiliently flexed against the collar 68 when subjected to a force at its outer end.

With reference to FIGS. 13A—13D, housing 55 consists of a generally rectangular box having opposed sides 55a, 55b, ends 55c, 55d, an internal longitudinal partition 55e and a closed bottom 55f. Bottom 55f is formed with a first rectangular opening 55g that is centrally disposed along one side, and a second smaller rectangular opening 55h that is located along the opposite edge in one corner.

Aligned recesses or transverse slots 55i, 55j are respectively formed in the side 55b and partition 55e at a generally central point thereof. Aligned transverse slots 55k, 55l are formed toward one end of the housing 55 in the central partition 55e and sidewall 55a.

Figure 13A:
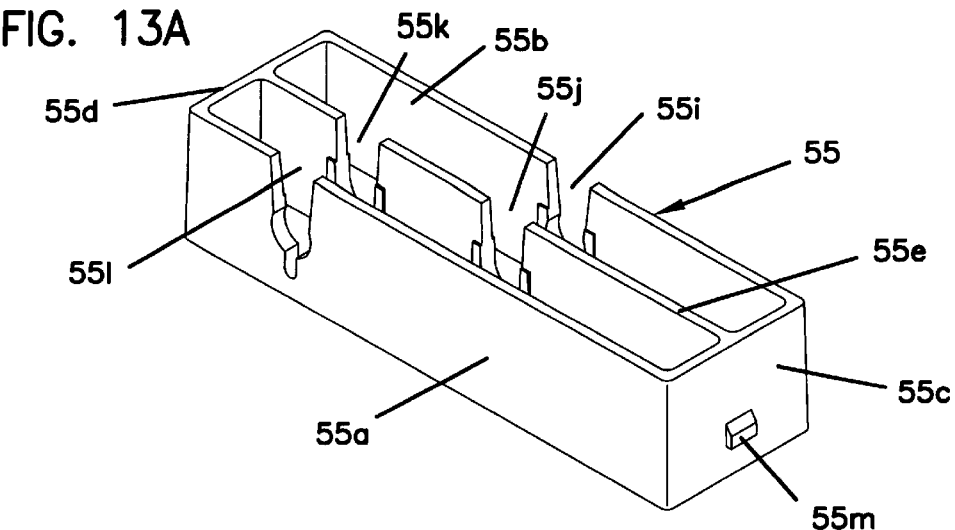
FIG. 13A is a perspective view of a housing adapted to receive a pair of spring loaded panel control members.
Figure 13B:
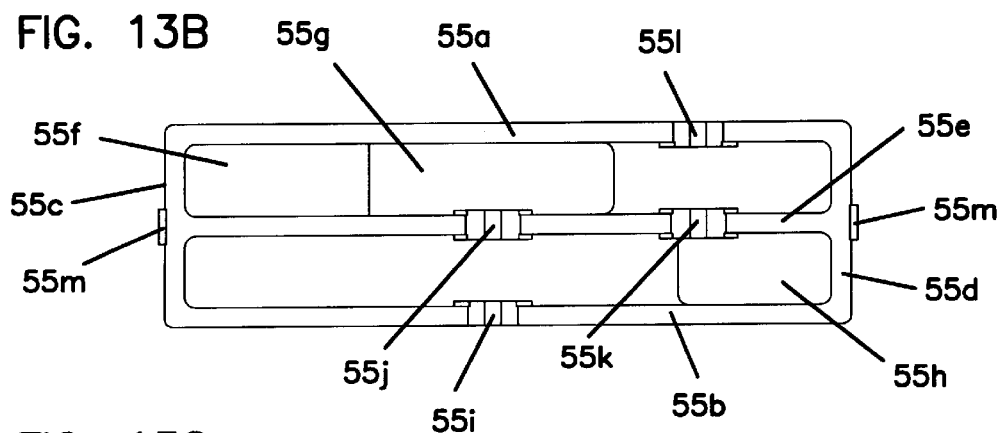
FIG. 13B is an elevational view of the front side of the housing.
Figure 15A:
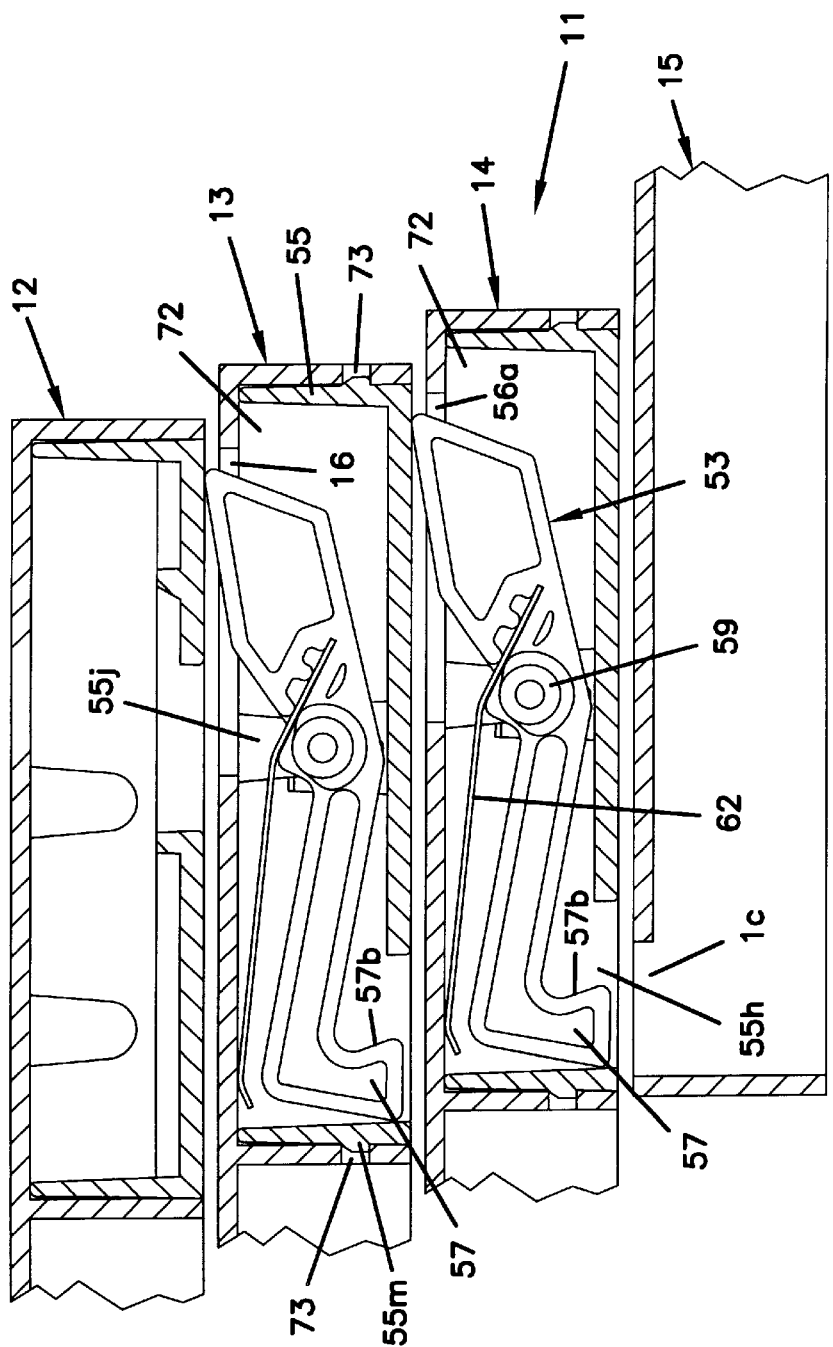
FIG. 15A is an enlarged fragmentary sectional view taken along the line 15—15 of FIG. 1 with the gate panels in a retracted position.

The elongated slot defined between sidewall 55b and partition 55e is sized to receive the first control member 53. As shown in FIGS. 13B and 15A, the circular bearing members 59 respectively fit into the transverse slots 55i, 55j. As best shown in FIG. 15A, control member 53 is oriented so that the hook member 57a may project externally from the rectangular opening 55h.

Similarly, the elongated slot defined by central partition 55e and sidewall 55a is sized to receive the second panel control member 54. Its circular bearings 67 respectively fit into the transverse slots 55k, 55l, and it is oriented so that the rear end of the hook member 65 may project externally from the rectangular opening 55g.

Figure 13C:
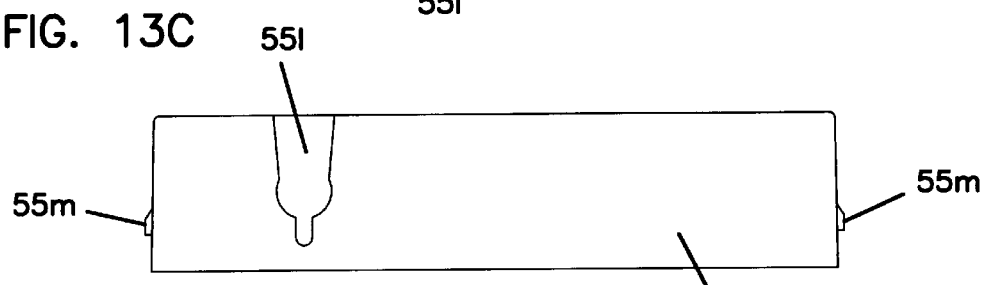
FIG. 13C is a top plan view of the housing.
Figure 13D:
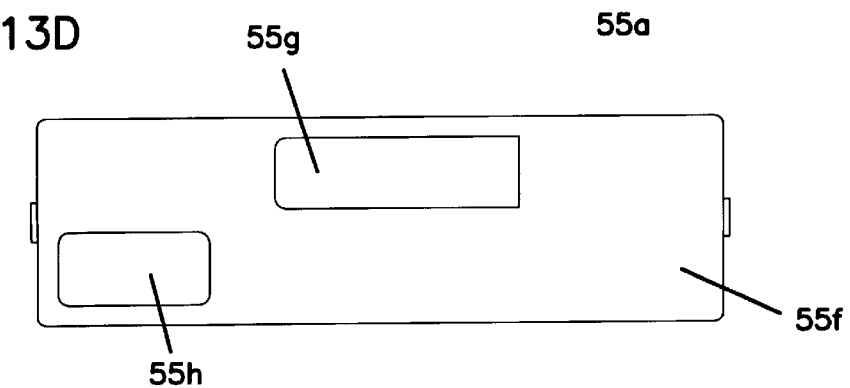
FIG. 13D is an elevational view from the rear side of the housing.
Figure 14A:
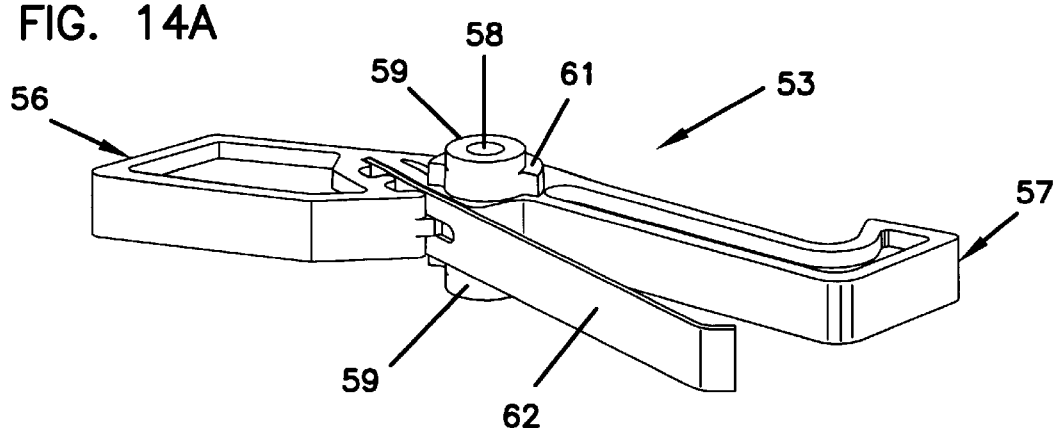
FIG. 14A is a perspective view of a first gate panel control member.
Figure 14B:
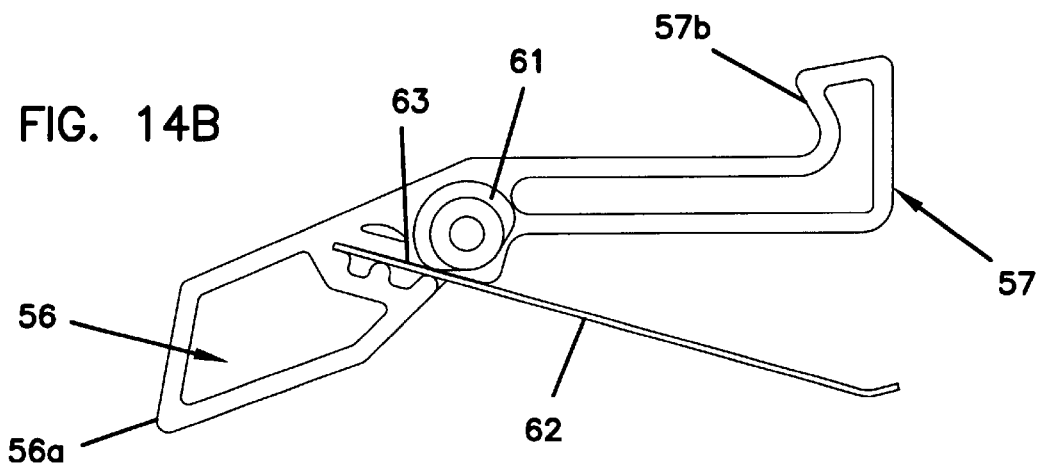
FIG. 14B is a top plan view of the first control member.
Figure 14C:
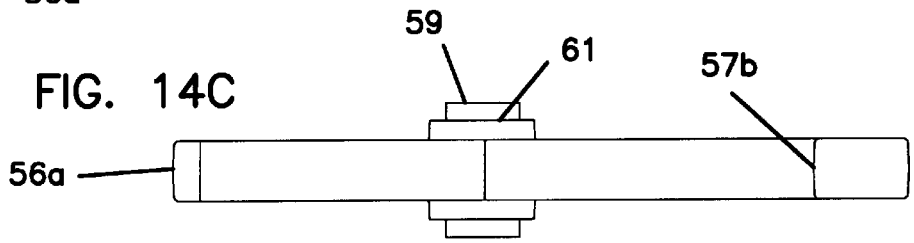
FIG. 14C is a side elevational view of the first control member.
Figure 14D:
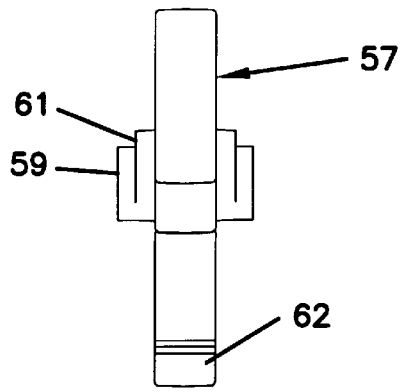
FIG. 14D is an end elevational view of the first control member.
Figure 17A:
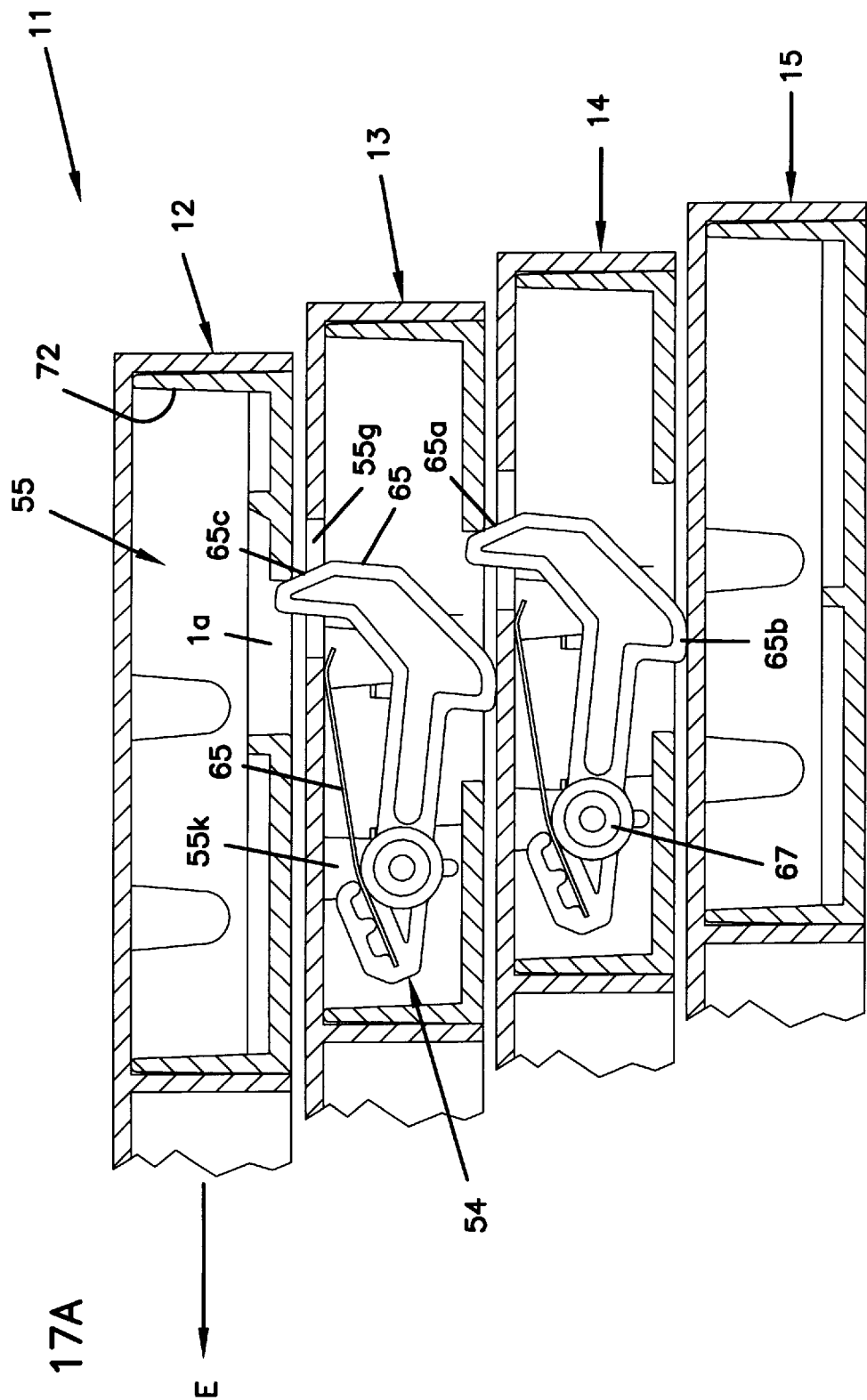
FIG. 17A is an enlarged fragmentary sectional view taken along the line 17—17 of FIG. 1 with the gate panels in a retracted position.

With reference to FIGS. 2 and 18, the frame member 1 of each of the gate panels 12–15 is formed with a rectangular recess or socket 72 in its rear face and beneath the passage 18 toward one side, which is sized to receive the housing 55 (see also FIGS. 15A, 17A). As best shown in FIGS. 13A, 13C and 15A, a small boss 55m is formed on the external face of each of the ends 55c, 55d of housing 55, and these bosses are positioned to snap into a pair of opposed apertures 73 formed in the sidewalls defining rectangular recess 72. The open top of the housing 55 faces the closed back wall of the recess 72 (i.e., the front face of frame member 1), and as best shown in FIGS. 15A, 17A, the respective spring members 62, 69 are flexibly biased against this back wall.

With reference to FIG. 19, a pair of rectangular apertures 1a, 1b are formed in the front face of frame member 1 in the wall that defines rectangular socket 72. Aperture 1a is the smaller of the two, and it is disposed in alignment with second control member 54 and positioned to receive hook-shaped member 65 when it is rotated against the bias of spring member 69 (see FIG. 17A). Aperture 1b is disposed in alignment with first control member 53 and positioned to receive the pointed end 56a when spring 62 is in its normal, unbiased state (see gate panel 13 in FIG. 15B).

Figure 15B:
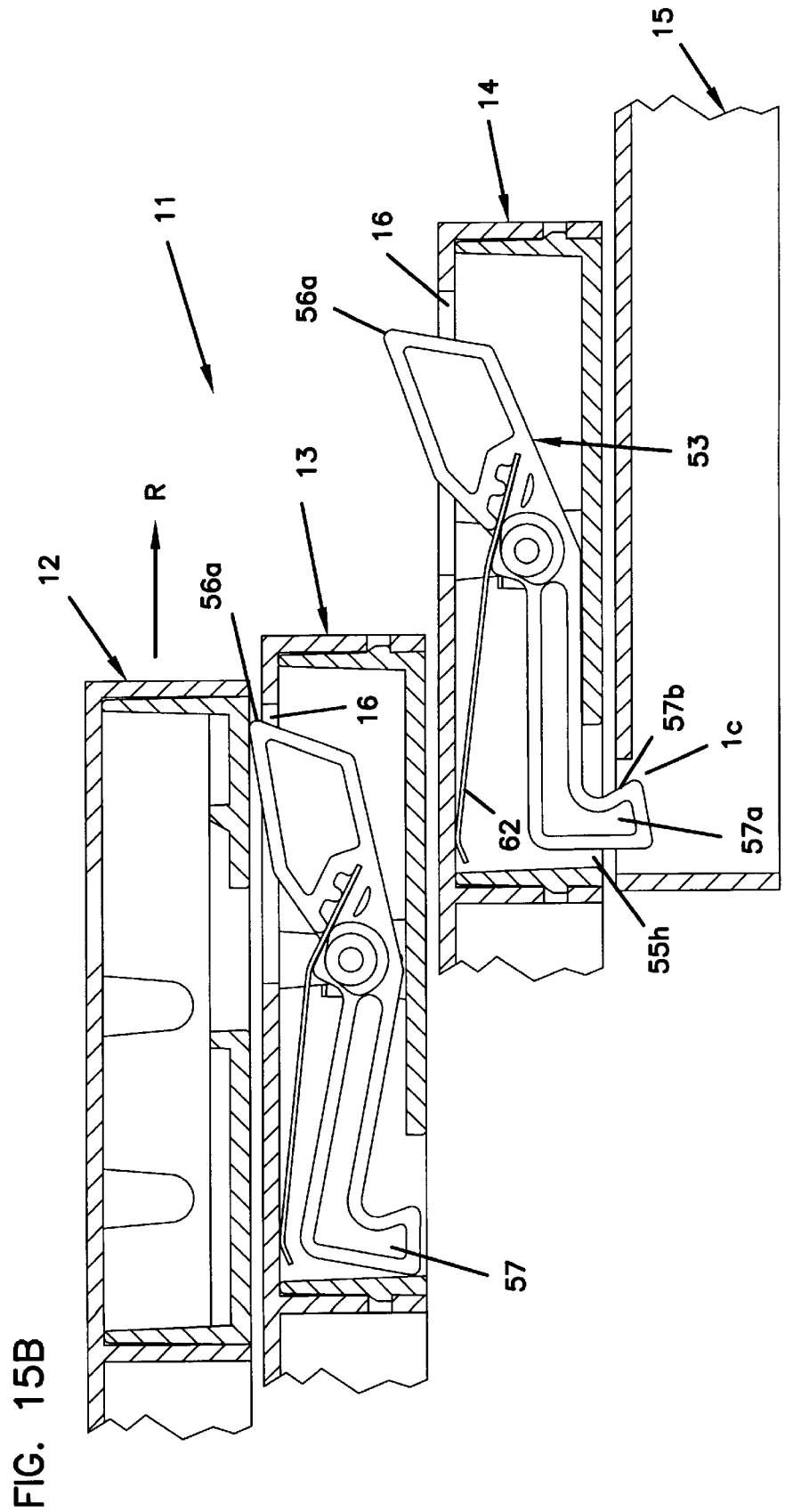
FIG. 15B is the view of FIG. 15a with the gate panels in a partially extended position.

With continued reference to FIG. 19, on the opposite side of the front face of top frame member 1 is a small rectangular aperture 1c that is disposed in alignment with first control member 53 and positioned to receive hook end 57a of an adjacent gate panel when control member 53 is in its normal position with spring 62 in an unbiased state (see gate panels 12, 13 in FIG. 15B).

Figure 16A:
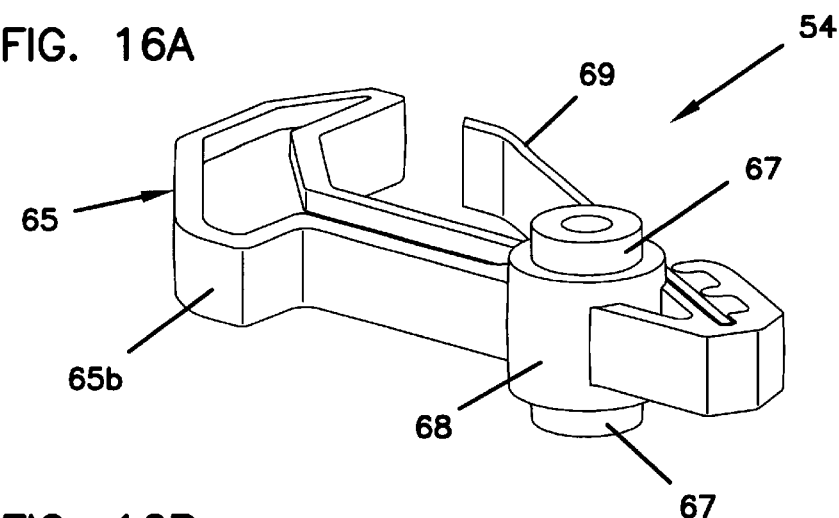
FIG. 16A is a perspective view of a second gate panel control member.
Figure 16B:
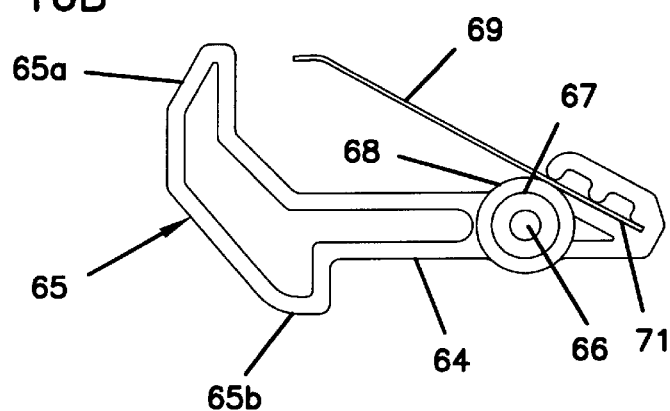
FIG. 16B is a top plan view of the second control member.
Figure 16C:
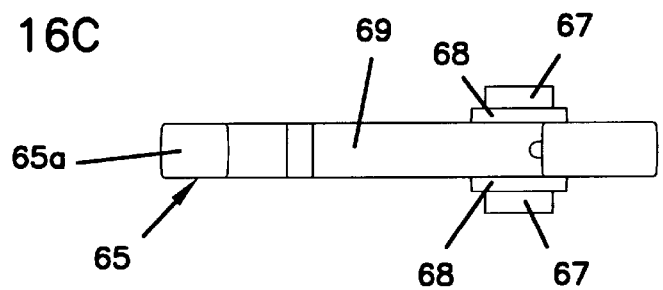
FIG. 16C is a side elevational view of the second control member.
Figure 16D:
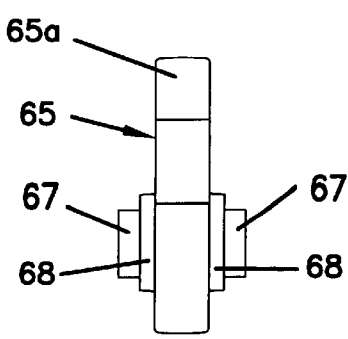
FIG. 16D is an end elevational view of the second control member.
Figure 17B:
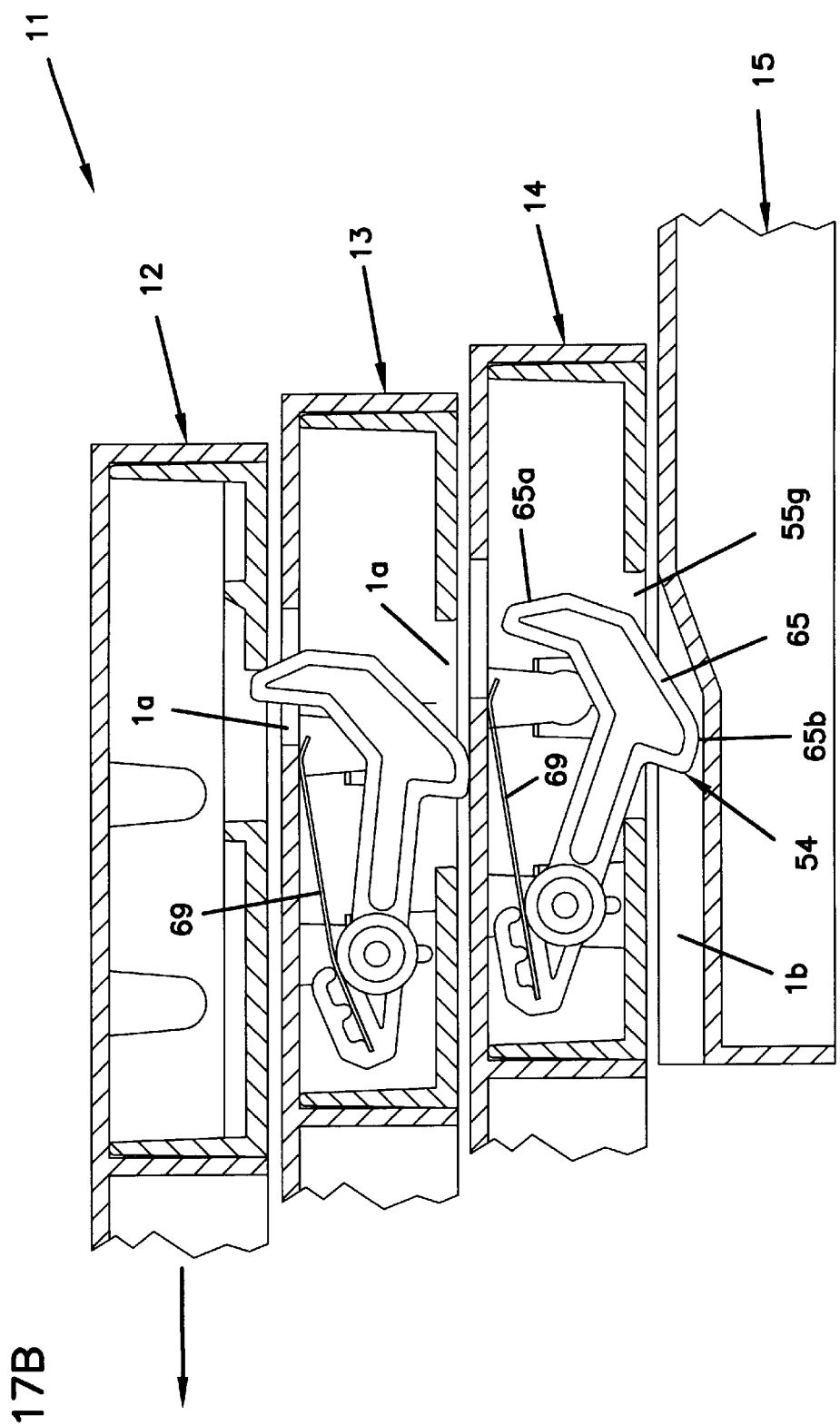
FIG. 17B is the view of FIG. 17a with the gate panels in a partially extended position.

With reference to FIGS. 16B and 19, disposed immediately above small aperture 1c is a guide groove 1d that is disposed in alignment with the first control member 54 and positioned to receive and guide the rear end of hook member 65 when the control member 54 is outwardly pivoted under the influence of spring 69 (see gate panel 13 of FIG. 17B).

As assembled, the first control member 53 is normally urged into the position shown in gate panel 13 of FIG. 15B, with the point 56a projecting through the rectangular aperture 1b in the front face of frame member 1, and the hook end 57a projecting externally from the rectangular aperture 55h of the housing bottom 55f into the aperture 1c of the adjacent gate panel. As shown in FIG. 17B, spring 69 biases the second panel control member 54 so that the rear end of hook member 65 normally projects externally from the rectangular opening 55g into guide groove 1d. When the control member 54 is pivoted against the bias of spring 69, the forward end of hook member 65 projects from the rectangular aperture 1a.

It will be observed from FIGS. 15A, B and 17A, B that control members 53, 54 are required only in the intermediate gate panels 13, 14 since it is only these elements that are necessary to accomplish the desired timing function.

The extension and retraction of the gate panels 12–15 as controlled by operation of the control members 53, 54 is disclosed in detail below. Broadly speaking, the operation and "timing" of gate panel movement is such that when the gate 11 is extended and retracted the various gate panels 12–15 are permitted to move only in progressive order; i.e., extending movement of a given panel is not permitted until the preceding panel is fully extended, and retracting movement of a given gate panel is not permitted until the adjacent panel is completely retracted. Stated another way, during extension and retraction operation of the security gate 11, only a single panel is permitted to slidably move relative to an adjacent panel. Retraction of the gate panels 12–15 is in the reverse progressive order.

This orderly progression of gate panel movement not only causes the security gate 11 to operate more smoothly, but also minimizes the potential problem of catching fingers between relatively moving gate panels. With regard to smooth operation, the fact that only one panel is in relative movement at a time prevents binding problems resulting from uncontrolled relative movement of any gate panel with respect to adjacent gate panels at any time during operation. The same holds true with regard to improved safety; i.e., the fact that gate panels move relatively only one at a time effectively minimizes the area in which fingers can be caught and pinched.

Specifically, and with the security gate 11 in a fully retracted position as shown in FIG. 17A, each of the control members 54 is pivotally rotated in a counter clockwise direction against the bias of spring 69 by engagement of the bearing surface 65c with the front face of the adjacent gate panel. This causes the forward projection of hook member 65 to project through the aperture 55g of its own gate panel as well as the aperture 1a in the adjacent gate panel. This prevents extension movement (see arrow E in FIGS. 17A, 17B) by the gate panel 12 relative to gate panel 13 and gate panel 13 relative to gate panel 14 because abutment surface 65a of projection 65 abuttably engages the edge defining aperture 1a. As long as control member 54 is rotated in this position, the gate panels 12–14 cannot be extended relative to one another.

With reference to FIG. 17B, when security gate 11 is extended by pulling gate panel 12 in direction E, the panels 12–14 initially move together as a group relative to gate panel 15. This is possible because there is no control member 54 in gate panel 15. This group movement of gate panels 12–14 continues until gate panel 14 approaches the end of gate panel 15. At this point, the bearing surface 65b of the control member 54 in gate panel 14 is moved into the groove 1d of gate panel 15. This pivotal movement is caused by the bias of spring 69 and is permitted because groove 1d is recessed from the front face of gate panel 15.

Although groove 1d extends to the outer edge of gate panel 15, it will be recalled that sliding movement of one panel relative to another is limited by the stop members 24 as they engage the associated rectangular projection 21.

As the control member 54 of gate panel 14 moves to the position shown in FIG. 17B, its abutment surface 65a moves away from the edge of aperture 1a in gate panel 13, and gate panels 12, 13 can now be extended together as a group relative to gate panel 14.

After gate panel 13 slides to its extreme position relative to gate panel 14, control member 54 of gate panel 13 likewise pivotally rotates in a clockwise direction, freeing gate panel 12 and permitting it to telescopically slide relative to gate panel 13.

It will be appreciated from the foregoing discussion that control member 54 controls the "timing" of relative panel movement as the security gate 11 is moved to its extended position.

Control member 53 controls the "timing" of gate panel movement as the security gate 11 is retracted from the extended or closed position to the retracted or opened position. Specifically, and with reference to FIG. 15A, when security gate 11 is retracted each of the control members 53 is pivotally rotated in a clockwise direction against the bias of spring 62 by the engagement of the pointed abutment surface 56a with the rear surface of the adjacent gate panel. In this position, the hooking member of each control member 53 is retracted from the aperture 1b and it has no operative effect.

As the security gate 11 is extended (as described in connection with FIGS. 17A, 17B), relative extending movement of one gate panel relative to an adjacent gate panel (see gate panels 13 and 14) unlocks aperture 1b, and spring 62 immediately pivotally rotates control member 53 in a counter clockwise direction. This causes hook member 57a to project through aperture 55h and into the aperture 1c of the adjacent gate panel. This is permitted only when the gate panel in question has reached its outer most position, and when this occurs retractive movement of such gate panel is prevented by engagement of the abutment surface 57b with the edge of aperture 1c.

The consequence of this operation is such that, with the security gate 11 in the fully extended position, retraction (in the direction represented arrow R FIG. 15B) is initially permitted only by relative movement of gate panel 12 relative to gate panel 13. As gate panel 12 reaches its inner most position on gate 13, its inner edge engages abutment surface 56a of the adjacent control member 53, causing control member 53 to rotate in a clockwise direction against the bias of spring 62. This in turn causes the hook member 57 to withdraw from the adjacent aperture 1c where it can no longer abuttable engage the adjacent panel. As such, gate panels 12 and 13 now retractably move as a unit relative to gate panel 14. As they reach closure, the control member 53 of gate panel 14 is similarly rotated, thereafter permitting movement of the gate panels 12–14 as a unit relative to gate panel 15.

The "timing" of this retractive movement also permits relative movement only between the first pair of adjacent gate panels, followed by progressive exclusive relative movement between the next pair of gate panels and so on.

As indicated above, the "timing" feature of extension and retraction afforded by the control members 53, 54 and associated structure better facilitates the sliding movement of the gate panels 12–15 and also minimizes potential injury to children who often insert fingers through the gate mesh. While the gate mesh could be made solid, this blocks the view of small children. It will also be appreciated that all movement of the gate panels 12–15 relative to one another is precluded when latching gate panel 12 is locked onto the locking rail 37.

What is claimed is:

1. A security gate for a passageway comprising:
   at least three gate panel means;
   connection means for connecting each of said gate panel means to adjacent gate an panel means for relative telescoping movement with respect thereto, with the gate panel means together moveable between a retracted and extended gate positions to open and close the passageway, wherein the relative movement from the retracted to the extended position is the reverse of the movement from the extended to the retracted position;
   and control means for controlling the relative movement of said gate panel means between said retracted and extended gate positions so that relative movement is permitted between only two panels at a given time;
   wherein said control means is constructed and arranged so that said relative movement is progressive as said gate panels are moved between said extended and retracted positions; and
   wherein said control means comprises:
      first control member means mounted on at least one of said gate panel means for movement relative thereto between extended and retracted positions;
      first biasing means for normally urging the first control member means to said extended position;

said first control member means comprising first projection means projecting laterally from one face of the gate panel means with the first control member means in its extended position, said first projection means constructed and disposed to be engaged by an adjacent gate panel means as it is moved toward its retracted gate position and to thereby cause the first control member means to move to its retracted position;

said first control member means further comprising second projection means projecting laterally from the opposite face of the gate panel means with the first control member means in its extended position, said second projection member means in its extended position, said second projection means being constructed and arranged to abuttably engage an adjacent gate panel means and prevent relative retractive movement therebetween, the second projection means being retracted from said abuttable engagement when the first control member means is moved to its retracted position.

2. The security gate as defined by claim 1, wherein the first control member means comprises a first control member pivotally connected to said gate panel means for rotational movement between said extended and retracted positions, said first and second projection means comprising first and second projection members integrally formed with the first control member and disposed in substantial opposition on said first control member, and said biasing means comprising a spring disposed between a stationary position on the gate panel means and said first control member.

3. The security gate as defined by claim 1, wherein the control means further comprises:

second control member means mounted on said one gate panel means for movement relative thereto between first and second positions;

second biasing means for normally urging the second control member means to said first position;

said second control member means comprising third projection means projecting laterally from said one face of said gate panel means with the second control member means in said first position, said third projection means being constructed and arranged to be engaged by an adjacent gate panel means in its retracted position and to become disengaged as the adjacent gate panel means is moved to its extended gate position;

said second control member means further comprising fourth projection means projecting laterally from the opposite face of said gate panel means with the second control member means in said second position, said fourth projection means being constructed and arranged to abuttably engage an adjacent gate panel means to prevent relative extending movement therebetween, the fourth projection means being retracted from said abuttable engagement when the second control member means moves to said first position.

4. The security gate defined by claim 3, wherein the second control member means comprises a second control member pivotally connected to said gate panel means for rotational movement between said first and second positions, said third and fourth projection means comprising third and fourth projection members integrally formed with the second control member and disposed in substantial opposition thereon, and said biasing means comprises a spring disposed between a stationary position on the gate panel means and said second control member.

5. The security gate defined by claim 1, wherein the connection means is constructed and arranged so that the gate panels are disposed in overlying face-to-face relation in said retracted gate position.

6. The security gate defined by claim 1, wherein said connection means is constructed and arranged to permit relative sliding movement between said gate panels.

7. The security gate defined by claim 6, wherein the connection means comprises groove means and elongated rail means disposed on each of said gate panel means, the groove means and rail means being constructed and arranged so that the rail means of one gate panel means is slidably disposed in the groove means of an adjacent gate panel means.

8. The security gate defined by claim 1, which further comprises stop means for limiting relative movement between adjacent gate panel means beyond fully retracted and fully extended positions.

9. The security gate defined by claim 8, wherein each of said gate panel means further comprises a longitudinal passage extending between the sides of the gate panel means and an abutment member disposed at each end of the longitudinal passage, said stop means being slidably disposed in said longitudinal passage, and means for securing said stop means to an adjacent panel means.

10. The security gated defined by claim 9, wherein each of said gate panel means further comprises a longitudinal groove adjacent said longitudinal passage, and the stop means comprises a rail member slidably disposed in said longitudinal groove.

11. The security gate defined by claim 1, wherein said control means is constructed and arranged to prevent relative movement between all panels other than those for which relative movement is permitted.

12. The security gate defined by claim 11, wherein the control means is further constructed and arranged so that relative movement is progressive as said gate panels are moved between said extended and retracted positions.

13. The security gate defined by claim 12, wherein the relative progressive movement from the retracted to the extended position is the reverse from the movement from the extended to the retracted position.

14. A security gate for a passageway defined by opposed first and second members, comprising:

gate means having first and second sides sized to substantially occupy the width between said opposed members;

hinge means for mounting the first side of said gate means to said first opposed member and to permit the gate means to swing between open and closed positions;

and gate closure means for releasably connecting the second side of said gate means to the second opposed member of said passage, the gate closure means comprising:

first latching means disposed on the second side of said gate means and comprising a first elongated latching rail mounted to the second side of the gate means, and first alignable retention means disposed on said first latching rail;

second latching means mountable on the second opposed member of said passageway and comprising a second elongated latching rail, and second alignable retention means disposed on said second latching rail;

the first and second alignable retention means being constructed and arranged for mutual retaining engagement when alignably disposed, wherein one of said first and second alignable retention means comprise substantially vertical projecting pin means, and the other of said first and second alignable retention means comprise projecting loop means, the loop means being disposed to vertically receive the pin means in said mutual retaining engagement;

and interlocking means for releaseably interlocking the first and second latching means when the first and second alignable retention means are in mutual retaining engagement, the interlocking means comprising an interlocking member mounted on said first latching rail, wherein the interlocking means is constructed and disposed to automatically interlock the first and second latching rails when said pin means is fully inserted into said loop means, the interlocking member comprising a deflectable leg member with a pawl member projecting therefrom, and a receptacle is formed in said second latching rail disposed to receive and retain the pawl member when said pin means is fully inserted into said loop means.

15. The security gate as defined by claim 14, wherein the pin means are disposed on said first latching rail, and the loop means are disposed on said second elongated latching rail.

16. The security gate as defined by claim 14, wherein the first latching rail comprises a plurality of said pin means and the second latching rail comprises a like plurality of loop means.

17. The security gate defined by claim 14, wherein the gate means comprises a top side and a bottom side, and which comprises two of said pin means symmetrically disposed on said one latching means in predetermined space relation relative to said top and bottom sides, and further comprises two of said loop means disposed on said other latching means in like spaced relation, the pin means and loop means being constructed and disposed so that the gate means may be oriented with the top side or the down side in an upward position.

18. The security gate defined by claim 14, wherein each of said pin means comprises a first pin member projecting substantially vertically toward the top side of said gate means and a second pin member projecting substantially vertically toward said bottom side, each of said pin members being disposed for insertion into the associated loop means.

19. The security gate defined by claim 18, wherein the interlocking means comprises an interlocking member mounted on said first latching rail, the latch member comprising a deflectable leg member with a pawl member projecting therefrom, and a receptacle formed in said second latching rail, the receptacle disposed to receive and retain said pawl member when said pin means is fully inserted into said loop means.

20. The security gate defined by claim 19, wherein the first latching rail comprises first and second receptacle means for releasably retaining the interlocking member, the first and second receptacle means being respectively disposed at opposite ends of the first latching rail, and the interlocking member is selectively and retainably inserted into one of said receptacle means.

21. The security gate defined by claim 14, wherein the first and second latching means are constructed and arranged to permit the gate means to be mounted in either of a right side up or upside down position.

22. A security gate for a passageway defined by opposed first and second members comprising:

gate means having first and second sides sized to substantially occupy the width between said opposed members;

hinge means for mounting the first side of said gate means to said first opposed member and to permit the gate means to swing between open and closed positions;

and gate closure means for releasably connecting the second side of said gate means to said second opposed member;

the hinge means comprising:
a first hinge member mounted on the first side of the gate means;
a second hinge member mountable to the first opposed member of said passageway;
connection means for releasably and hingeably connecting the first and second hinge members for hinged, pivotal movement;
and latching means for releasably latching the first and second hinge members when they are hingeably connected, wherein the latching means comprises a latching member disposed on said first hinge member, the latching member comprising a deflectable leg member with a pawl member projecting from, and the first hinge member comprises a bearing member disposed to engageably deflect the pawl member and to be retained thereby when the pin means is fully inserted into said loop means.

23. The security gate defined by claim 22, wherein the connection means comprises substantially vertical projecting pin means disposed of one of said first and second hinge members and laterally projecting loop means disposed on the other of said first and second hinge members to vertically receive the pin means in said hinged, pivotal relationship.

24. The security gate defined by claim 23, wherein the first and second hinge members are elongated in configuration, the pin means being disposed on the second hinge member and the loop means being disposed on the first hinge member.

25. The security gate defined by claim 24, wherein the first hinge member comprises a plurality of said loop means and the second hinge member comprises a plurality of said pin means.

26. The security gate defined by claim 23, wherein the latching means is constructed and disposed to automatically interlock the first and second hinge members when said pin means is fully inserted into said loop means.

27. The security gate defined by claim 22, wherein the first and second hinge members are constructed and arranged to permit the gate means to be mounted in either of a right side up or upside down position.

* * * * *